(12) United States Patent
Suzuki

(10) Patent No.: US 7,034,964 B2
(45) Date of Patent: Apr. 25, 2006

(54) METHOD AND APPARATUS FOR GRADATION REPRODUCTION OF CONTINUOUS TONE IMAGE

(75) Inventor: Masahiro Suzuki, Chiba (JP)

(73) Assignee: Seiko Instruments Inc., Chiba (JP)

( * ) Notice: Subject to any disclaimer, the term of this patent is extended or adjusted under 35 U.S.C. 154(b) by 870 days.

(21) Appl. No.: 09/796,137

(22) Filed: Feb. 28, 2001

(65) Prior Publication Data

US 2001/0021041 A1    Sep. 13, 2001

(30) Foreign Application Priority Data

| Mar. 7, 2000 | (JP) | ............... 2000-062411 |
| May 11, 2000 | (JP) | ............... 2000-138695 |
| Feb. 16, 2001 | (JP) | ............... 2001-040590 |

(51) Int. Cl.
*H04N 1/40* (2006.01)

(52) U.S. Cl. ........................ 358/3.06; 358/1.9

(58) Field of Classification Search ............. 358/1.9, 358/3.06–3.12, 2.1; 382/237
See application file for complete search history.

(56) References Cited

U.S. PATENT DOCUMENTS

| 5,077,615 A | 12/1991 | Tsuji ..................... 358/298 |
| 5,539,667 A | 7/1996 | Rode ..................... 364/525 |
| 5,898,507 A | 4/1999 | Nakane et al. ........... 358/448 |
| 6,751,358 B1 * | 6/2004 | Mantell et al. .......... 382/252 |

FOREIGN PATENT DOCUMENTS

| EP | 0781034 | 6/1997 |
| EP | 0786741 | 7/1997 |
| EP | 0903932 | 3/1999 |
| EP | 0959429 | 11/1999 |

OTHER PUBLICATIONS

K. Knox and R. Eschbach: "Threshold Modulation In Error Diffusion" Journal of Electronic Imaging vol. 2, No. 3, Jul. 1993, pp. 185-192 XP000394877 Bellingham.

* cited by examiner

Primary Examiner—Thomas D. Lee
Assistant Examiner—Stephen Brinich
(74) Attorney, Agent, or Firm—Adams & Wilks

(57) ABSTRACT

An apparatus for gradation reproduction of a continuous tone image has a pseudo-random number adding section for adding pseudo-random numbers to input image data corresponding to a target pixel. A look-up table contains threshold values corresponding to and determined in accordance with gradation of the input image data. A conversion section converts the gradation of the input image data into multi-value data based on at least three values by using at least two of the threshold values contained in the lookup table. An error computation section computes an error between states of the gradation of the input image data before and after conversion thereof into multivalue data by the conversion section. An error diffusing section spreads the error computed by the error computation section to pixels neighboring the target pixel in accordance with preselected weight coefficients.

15 Claims, 25 Drawing Sheets

METHOD AND APPARATUS FOR GRADATION REPRODUCTION OF CONTINUOUS TONE IMAGE

BACKGROUND OF THE INVENTION

1. Field of the Invention

The present invention relates to a method and apparatus for gradation reproduction of continuous tone images in which the gray scale of a continuous tone image is converted into multiple levels of three or more.

2. Description of the Related Art

There are printers with a type expressing one dot by the existence/nonexistence of ink, i.e., by binary expression. There are also printers which print one dot by selectively using light and dark inks or by changing the dot size, i.e., printers of a type expressing one dot by multivalue expression. Printers of this type can express gradation change more smoothly in comparison with those using binary expression, and also have the advantage of making dots in a highlight portion inconspicuous. To perform printing with a multi-value type printer, multivaluing processing for converting the gray scale of an original image into not two levels but multiple levels (at least three levels) is required.

It is necessary that input image data to be multivalued have a sufficiently large number of gray-scale levels (e.g., 256 levels). Multiple values of multivaluing are a number of values larger than 2, e.g., 3.

When multivaluing is performed, an error diffusion method, which is also useful with respect to two-valuing, may be used. A error diffusion method uses a process in which, when an input image data is mutivalued, an error caused between the state before multivaluing and the state after multivaluing is diffused in subsequent data on the basis of proportions according to weight coefficients. According to the error diffusion method, a grayscale error caused at the time of multivaluing is eliminated by being spread to neighboring pixels, thereby improving the reproducibility of a continuous tone image.

A gradation reproduction apparatus described in Japanese Patent Laid-Open Publication No. 11-17946 (hereinafter referred to as conventional art) is known as an apparatus for carrying out a continuous tone image gradation reproduction method based on a multivaluing-error diffusion method such as that described above.

The conventional art described in the above-mentioned publication includes an example of 3-valuing as multivaluing, which is described as a process in which input image data on each of the pixels expressed by, for example, 256 values (value 0 to value 255) supplied from an unillustrated host computer is converted into a 3-value data (a kind of multivalue data) expressed by, for example, white [0], gray [1], and black [2].

As shown in FIG. 43, the conventional art 21 includes, in a basic arrangement according to a gradation reproduction method based on a 3-valuing error diffusion method, an adder 22 for correcting input image data on a particular pixel (target pixel) by adding a corrected error to form corrected data, a 3-valuing section 23 for three-valuing the corrected data obtained by the adder 22 by using two threshold values, a 3-value memory 24 for storing 3-value data obtained by the 3-valuing section 23, an error detection section 25 for detecting an error between the correction data and the 3-value data with respect to the target pixel, an error spreader 26 for spreading the error detected by the error detection section 25 to unprocessed pixels (neighbor pixels) positioned near the target pixel on the basis of weight coefficients which determine how the error is spread to the neighbor pixels, and an error memory 27 for accumulating errors determined by the error spreader 26 with respect to each pixel, and thereafter transferring the accumulated errors as a corrected error to the adder 22.

The 3-valuing section 23 3-values corrected data by using two threshold values, e.g., a first threshold value of 64 and a second threshold value of 192. The value 64 is an intermediate value between the value 0 and the value 128, and the value 192 is an intermediate value between the value 128 and the value 255.

Under this condition, the 3-valuing section 23 selects white [0] in 3-value data when the corrected data is equal to or smaller than the value 63, selects gray [1] when the corrected data is in the range from the value 63 to the value 192, and selects black [2] in 3-value data when the corrected data is equal to or larger than the value 193.

While the above-mentioned input image data is expressed by, for example, the values 0 to 255 as mentioned above, the above-described corrected data may have a value smaller than 0 and a value exceeding the value 255 since a corrected error is added to the input image data.

Corrected errors transferred from the error memory 27 to the adder 22 appear in a vibrating manner with variations in magnitude. Accordingly, corrected data formed by adding the corrected errors to the input image data also appear in a vibrating manner with the same amplitude as the corrected errors.

A case of 3-valuing of input image data with respect to a test image 29 shown in FIG. 44, using the above-described basic arrangement of the conventional art 21, will next be described.

FIG. 44 is a plan view of a test image 29. The test image 29 has a matrix of 256 dots horizontally by 64 dots vertically, and has continuous gradation from solid black to solid white in the horizontal direction.

FIG. 45 is a diagram showing the distribution of data values of the test image 29 shown in FIG. 44. In FIG. 45, the abscissa represents the position in the horizontal direction on the test image 29 shown in FIG. 44, and the ordinate represents the gray scale of the test image 29 by 256 data values in the range from the value 0 to the value 255, the value 255 representing solid black, the value 0 representing solid white.

The gradation in the test image 29 shown in FIG. 44 is reproduced by 3-valuing using the above-described basic arrangement of the conventional art 21 shown in FIG. 43. Since the two threshold values for 3-valuing are the values 64 and 192, which are fixed threshold values widely spaced apart, vibrating corrected data falls into the range between the two threshold values, and no data item spikes outward beyond the two threshold values.

FIG. 46 is a plan view schematically showing a reproduced image obtained in the above-described manner. The reproduced image shown in FIG. 46 has a gradation reproduction region 31 in which gradations are reproduced by white dots and gray dots from a solid white portion to a certain light gradation, and a gradation reproduction region 32 in which gradations are reproduced by black dots and gray dots from a solid black portion to a certain dark gradation. However, a solid gray region 33 is formed at a halftone gradation at a position between the solid white portion and the solid black portion. The solid gray region 33 is recognized as a contour which does not exist originally. As a result, a gradation discontinuity is caused.

FIG. 47 is a diagram in which the reproduced image shown in FIG. 46 is expressed by a dot distribution. As shown in the dot distribution diagram shown in FIG. 47, a region is formed in which there are no black dots BL and no white dots WH at the halftone gradation, and in which only gray dots GR exist.

To eliminate such a gradation discontinuity caused at an intermediate gradation in solid gray region 33, an in-window pixel checking section 28 is added to the basic arrangement in the conventional art 21, as shown in FIG. 43.

The in-window pixel checking section 28 checks whether all the items of 3-value data on a plurality of pixels existing in a predetermined window (indicated by hatching in symbol 28 in FIG. 43) in the 3-value data memory 24 are gray [1].

If there is white [0] or black [2] in the 3-value data on the pixels in the predetermined window, the 3-valuing section 23 performs ordinary 3-valuing processes described above, that is, 3-valuing using the threshold value 64 and the threshold value 192.

On the other hand, if all the items of 3-value data on the pixels in the predetermined window are gray [1], the 3-valuing section 23 performs special 3-valuing processing, that is, it changes the two threshold values so that the interval therebetween is reduced. More specifically, it substitutes the value 120 for the threshold value 64, and substitutes the value 136 for the threshold value 192.

Under this condition, the 3-valuing section 23 selects white [0] in 3-value data when the corrected data is equal to or smaller than the value 119, selects gray [1] when the corrected data is in the range from the value 120 to the value 136, and selects black [2] in 3-value data when the corrected data is equal to or larger than the value 137.

If the interval between the threshold values is reduced as described above, the probability of occurrence of gray [1] as a result of 3-valuing is reduced and occurrences of white [0] and black [2] are increased, so that the vibrating corrected data spikes outward beyond the two threshold values with respect to the halftone gradation. Consequently, the corresponding 3-valuing results consist of not only gray [1] but also white [0] and black [2], and, at the time of printing (image reproduction), gray dots, white dots and black dots are suitably mixed and no solid gray such as that described above (see symbol 33 in FIG. 27) occurs, thus achieving continuous gradation even at the halftone gradation.

As described above, in the conventional art 21 (see FIG. 43), the interval between the two threshold values is reduced if it is determined that all the items of 3-value data on a plurality of pixels in the predetermined window in the 3-value data memory 24 are gray [1].

The above-described conventional art 21, however, has the problems described below.

(1) There is no criterion for determining how the actual reduction takes place in the interval between the two threshold values for setting a suitable mixture of gray dots, black dots and white dots at the halftone gradation. If the interval between the two threshold values is excessively reduced, the proportion of black dots and white dots at the halftone gradation becomes excessively high and the proportion of gray dots becomes insufficient. On the other hand, if the reduction in the interval between the two threshold values is inadequate, solid gray at the halftone gradation is not eliminated.

Thus, the conventional art 21 lacks a criterion for determination of suitable threshold values and, therefore, is unsatisfactory in terms of practical use.

(2) Because of the need for reading out 3-value data on a plurality of pixels in the predetermined window in the 3-value memory, and for checking whether all the items of 3-value data are 1 (gray), the necessary algorithm is complicated.

SUMMARY OF THE INVENTION

A main object of the present invention is to provide a method and apparatus for gradation reproduction of continuous tone images having a determination criterion for reliably setting suitable threshold values ensuring continuity at the halftone gradation.

Another object of the present invention is to provide an apparatus for gradation reproduction of continuous tone images which is free from the need of ascertaining whether all items of multivalue data in a predetermined range are the same, and which uses a simple algorithm.

To achieve the above-described main object, according to the present invention, there is provided a method for gradation reproduction of a continuous tone image based on a error diffusion method in which, when the gradation of input image data on a continuous tone image is converted into multivalue data based on multiple values which are at least three values by using at least two sets of threshold values to reproduce a gradation, an error between a data item before multivaluing and the corresponding multivalued data item is spread, as a corrected error, under spreading conditions determined by weight coefficients, to a plurality of subsequent data items successively input to obtain corrected data, and the corrected data is multivalued, the gradation reproduction method comprising determining the interval between the threshold values so that the amplitude of the corrected data according to rising and falling variations in the corrected error spikes outward beyond the threshold values at least at a halftone gradation between a darkest gradation and a lightest gradation, whereby generation of a transient region is prevented where the amplitude of the corrected data becomes excessively small at the halftone gradation of the corrected data, and wherein pseudo-random numbers are added to the input image data.

Also to achieve the above-described main object, the method for gradation reproduction of a continuous tone image according to the present invention produces the amplitude of the corrected error depending upon the spreading conditions according to the weight coefficients, and determines the interval between the threshold values so that the amplitude spikes outward beyond the threshold values at least at the halftone gradation.

To achieve the above-described other object, the method for gradation reproduction of a continuous tone image according to the present invention determines the threshold values according to the gradation of the input image data by referring to a threshold value look-up table in which the interval between the threshold values according to the weight coefficients is determined in advance, and in which the threshold values according to the gradation of the input image data are set in advance, and inputs the input image data to the threshold value look-up table, and the look-up table determines the threshold values according to the gradation of the input image data.

To also achieve the above-described main object, the method for gradation reproduction of a continuous tone image according to the present invention sets the amplitude of the pseudo-random numbers so that the amplitude does not exceed a certain limit value, makes the amplitude variable according to the value of input image data, makes the amplitude zero when the value of input image data is zero or at the maximum of the dynamic range, and makes the amplitude smoothly changeable with respect to the input image data.

To also achieve the above-described main object, the method for gradation reproduction of a continuous tone image according to the present invention determines the amplitude of the pseudo-random numbers by referring to an amplitude limit value look-up table in which limit values of the amplitude of the pseudo-random numbers according to the input image data are set in advance.

DETAILED DESCRIPTION OF THE PREFERED EMBODIMENTS

An embodiment mode for implementing the method and apparatus for gradation reproduction of continuous tone images in accordance with the present invention will be described with reference to the drawings.

FIGS. 1 through 5 show an embodiment mode of implementing the apparatus for gradation reproduction of continuous tone images in accordance with the present invention.

Before the description of the gradation reproduction apparatus in this embodiment mode, an image processing system including in its portion the gradation reproduction apparatus in this embodiment mode will be described.

Figure 2:
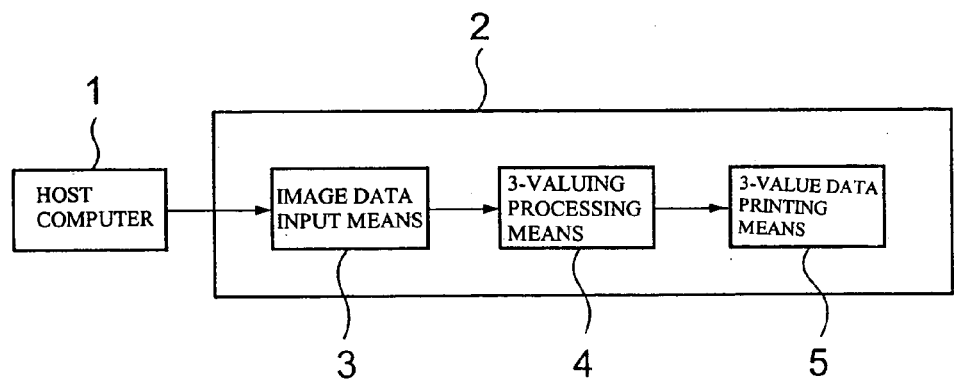
FIG. 2 is a block diagram showing a system having as its portion the continuous tone image gradation reproduction apparatus shown in FIG. 1.

The image processing system has, as shown in FIG. 2, a host computer 1, and a printer 2 connected to the host computer 1.

The host computer 1 transfers data on an original image to the printer 2.

For example, original image data transferred from the host computer 1 is image data read in by an unillustrated image scanner, image data stored in storage means of the host computer 1, or image data such as computer graphics artificially made in the host computer 1.

The printer 2 has an image data input means 3 which is supplied with original image data from the host computer 1, and which expresses image data (input image data) in multiple gradation steps such as, for example, 256 values (value 0 to value 255) with respect to each pixel, a 3-valuing processing means 4 which is supplied with image data transferred from the image data input means 3, which converts the supplied image data into 3-value data (3-valued as, for example, white [0], gray [1], and black [2]), and which corresponds to the gradation reproduction apparatus in this embodiment mode, and a 3-value data printing means 5 for performing printing (gradation reproduction) on the basis of 3-value data output from the 3-valuing processing means 4.

Figure 1:
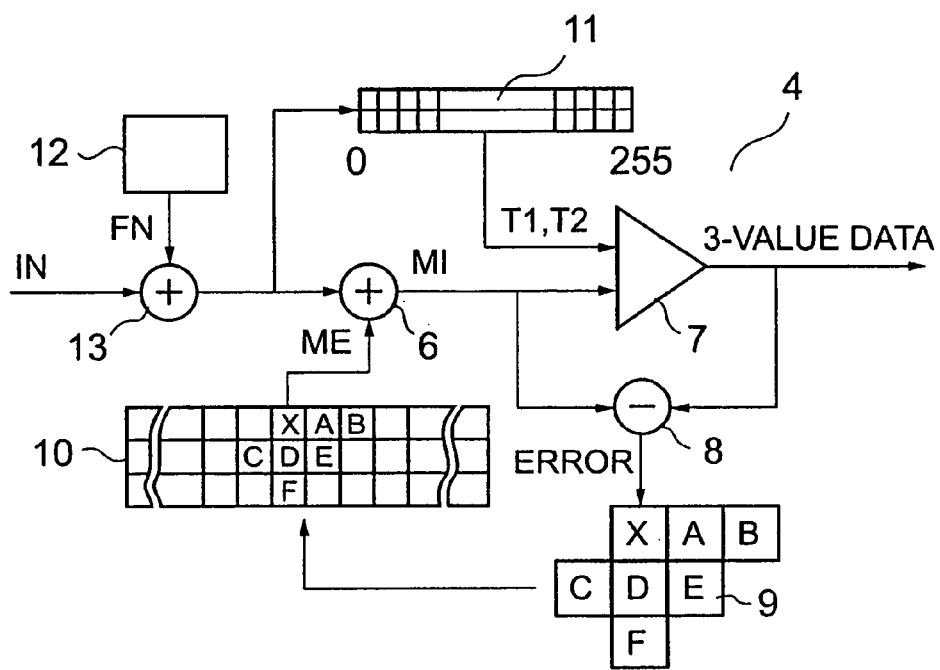
FIG. 1 is a block diagram showing the configuration of a continuous tone image gradation reproduction apparatus in an implementation mode of the present invention.

FIG. 1 shows the configuration of the 3-valuing processing means 4 (gradation reproduction apparatus).

As shown in FIG. 1, the 3-valuing processing means 4 has, as components in a basic arrangement for gradation reproduction based on a 3-valuing error diffusion method, an adder 13 for adding pseudo-random numbers FN to input image data IN on a target pixel input from the host computer 1 (see FIG. 2) a pseudo-random number section 12 for generating pseudo-random numbers FN, an adder 6 for correcting the input image data IN, to which pseudo-random numbers FM have been added, by adding a corrected error ME to form corrected data MI, a 3-valuing section 7 for threevaluing the corrected data MI obtained by the adder B6 by using two sets of threshold values, an error computation section 8 for computing an error between the corrected data MI about the target pixel and the 3-value data about the target pixel three-valued by the 3-valuing section 7, an error diffusing section 9 for spreading the error computed by the error computation section 8 to neighbor pixels according to predetermined weight coefficients, and an error memory 10 for accumulating errors spread by the error diffusing section 9 with respect to each pixel and thereafter transferring the accumulated errors as a corrected error ME to the adder 6.

The weight coefficients used in error diffusing by the error diffusing section 9 designate the bounds of neighbor pixels to which an error is spread, and proportions of values respectively spread to neighbor pixels when an error is spread to the respective pixels.

An example of the weight coefficients will be described. In the error diffusing section 9 in FIG. 1, in a case the target pixel is x, and unprocessed neighbor pixels to which an error Er is to be spread are limited to a range of six pixels A, B, C, D, E, and F, and proportions of values spread to the pixels A to F are, for example, as shown below.

With respect to pixel A, $(3/10) \times Er_0$
With respect to pixel B, $(1/10) \times Er_0$
With respect to pixel C, $(1/10) \times Er_0$
With respect to pixel D, $(3/10) \times Er_0$
With respect to pixel E, $(1/10) \times Er_0$
With respect to pixel F, $(1/10) \times Er_0$ When the pixels A to F processed as a target pixel is input as input image data IN, the errors accumulated on the pixels A to F in the error memory 10 are transferred to the adder 6 to be added as corrected error ME to the input image data IN.

Further, the 3-valuing processing means 4 is provided with a threshold value look-up table (hereinafter referred to as "threshold value LUT") 11 which is referred to when the magnitude of the two sets of threshold values and the interval between the two sets of threshold values are determined.

In a case of 3-valuing, for example, two values, such as those described above, i.e., the first threshold value 64 and the second threshold value 192, may be used as threshold values. With respect to this embodiment mode, however, a case where the set of threshold values is extended and threshold values are selected according to the threshold value of input image data will be described. That is, in this embodiment mode, threshold value sets each consists of 256 threshold values are defined with respect to 256 values, the values 0 to the value 255, and 3-valuing is performed by using the two sets of threshold values.

The amplitude of the above-described corrected error depends on the configuration of the above-described weight coefficients. That is, if the number of neighbor pixels to which an error is spread is larger, the amplitude of the corrected error is reduced.

If, with respect to the amplitude of the corrected error (equal to the amplitude of corrected data), the interval between the two sets of threshold values is excessively reduced, there is substantially no corrected data between the two sets of threshold values, and almost all corrected data items spike outward beyond the two sets of threshold values. As a result, a reproduced image has excessively large amounts of black and white and an excessively small amount of gray in comparison with the original image.

On the other hand, if with respect to the amplitude of the corrected error the interval between the threshold values is not adequately reduced (too large), almost the entire corrected data falls between the two sets of threshold values, and there is substantially no corrected data items spiking outward beyond the two sets of threshold values. As a result, the amount of gray is excessively large and solid gray is generated.

In this embodiment mode, the 3-value data printing means 5 is arranged to express shades of an image by lightness and darkness of dots. Black is expressed by dark dots, gray is expressed by light dots, and white is expressed by the absence of dots. In the following description, a dark dot is referred to "black dot", a light dot is referred to as "gray dot", and the absence of a dot is referred to as "white dot".

In this embodiment mode, [0] of 3-value data corresponds to a white dot, [1] corresponds to a gray dot, and [2] corresponds to a black dot.

As an alternative to such expression of light and shade of an image by lightness and darkness of dots, expression by small and large sizes of dots, for example, may be performed.

Figure 3:
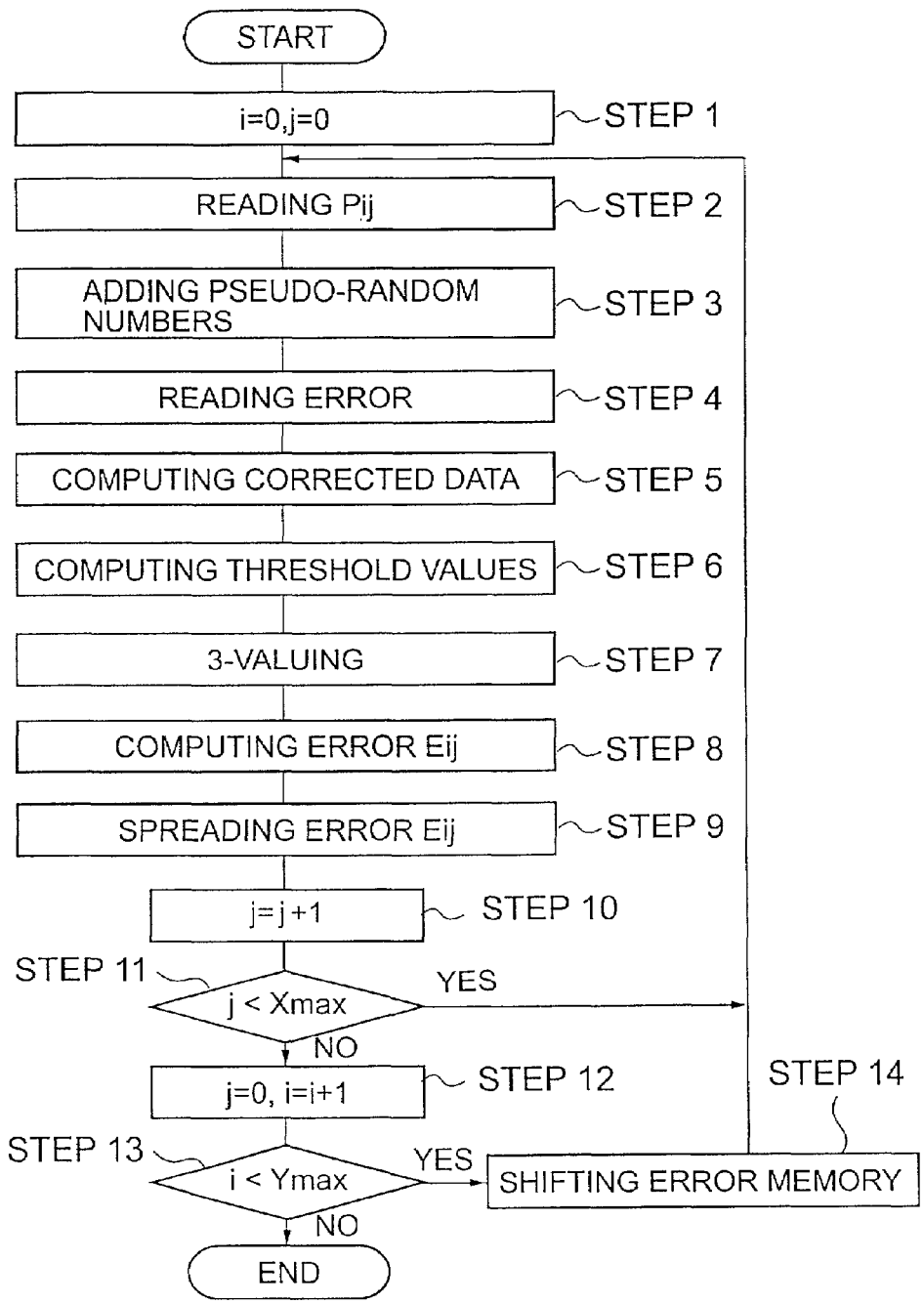
FIG. 3 is a flowchart for explaining a continuous tone image gradation reproduction method using the continuous tone image gradation reproduction apparatus shown in FIG. 1.

The operation of the 3-valuing processing means 4 arranged as described above will be described with reference to the configurational diagrams of FIGS. 1 and 2 and the flowchart of FIG. 3.

First, an original image is sectioned into pixels arranged in rows and columns, and each pixel is expressed by one of the rows arranged in the vertical direction and one of the columns arranged in the horizontal direction. The 3-valuing processing means 4 starts reading from the pixel in the row 0 and in the column 0 (Step 1 in FIG. 3) and reads in input image data Pij on the pixel (target pixel) in the row i and in the column j (Step 2). Then, pseudo-random numbers generated by the pseudo-random number section are added to the read in input image data (Step 3).

Next, spread and accumulated errors related to the target pixel are read from the error memory 10 as a corrected error from the neighbor pixels of the target pixel (Step 4).

The adder 6 adds the corrected error read in from the error memory 10 to the input image data Pij of the target pixel to correct the input data, thereby computing corrected data (Step 5).

Also, the threshold value LUT 11 computes two threshold values according to the input image data Pij on the target pixel (Step 6).

Then, in the 3-valuing section 7, the corrected data and the two threshold values are compared and the corrected data is three-valued to be obtained as 3-value data (Step 7).

In the error computation section 8, an error Eij produced by comparing the corrected data and the 3-value data is computed (Step 8).

Next, the error diffusing section 9 spreads the error Eij to the neighbor pixels according to the predetermined weight coefficients, and updates the contents of the error memory 10 by storing the error for each pixel (Step 9).

After processing of the pixel in the column j has been completed as described above, j=j+1, that is, the process proceeds one column (Step 10). Processing is successively performed on the pixels in the subsequent columns. When processing on the pixel in the final column is completed (Step 11), i=i+1, that is, the process proceeds one row, processing is started from the first column, i.e., j=0 (Step 12). Each time the row is changed, the contents of the error memory 10 are shifted one line. When processing on the final line is completed, the entire process ends (Steps 13, 14).

Figure 4:
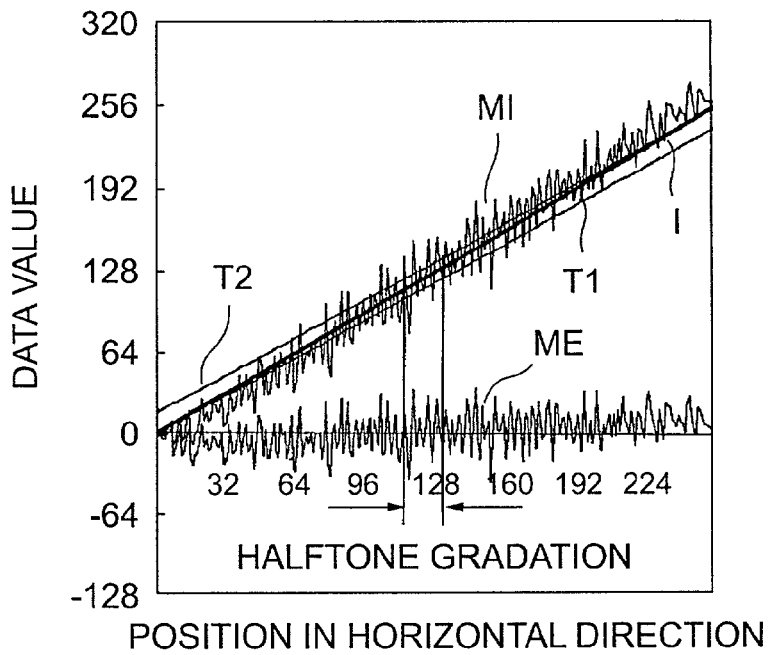
FIG. 4 is a graph for explaining the relationship between parameters in the continuous tone image gradation reproduction apparatus shown in FIG. 1.
Figure 5:
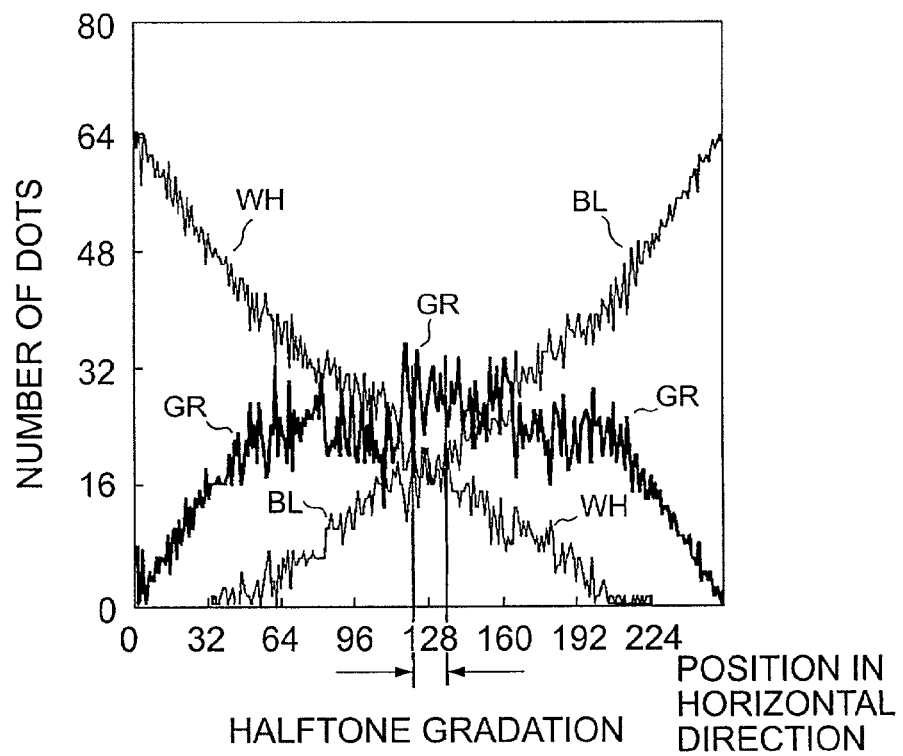
FIG. 5 is a graph showing a dot distribution obtained by the operation with the parameters shown in FIG. 4.

Contents relating to the operation in Step 5 of computing corrected data by adding the corrected error read from the error memory 10 to the input image data in the adder B6 as described above, the operation in Step 6 of computing two threshold values from the input image data by the threshold value LUT 11, the operation in Step 7 of 3-valuing the corrected data by comparing the corrected data and the two threshold values in the 3-valuing section 7 and the like, will be described in detail with reference to FIGS. 4 and 5. In the following, the description is made by assuming that addition of pseudo-random numbers is not performed first.

FIG. 4 is a graph for explaining various parameters in the above-described 3-valuing processing means 4 (see FIG. 1), showing, as parameters, two sets of threshold values T1 and T2, input image data IN, corrected error ME, and corrected data MI. In this case, the values of the parameters are examined and indicated with respect to processing of dots in one horizontal line passing a center of the image in order to avoid transient influence.

Figure 44:
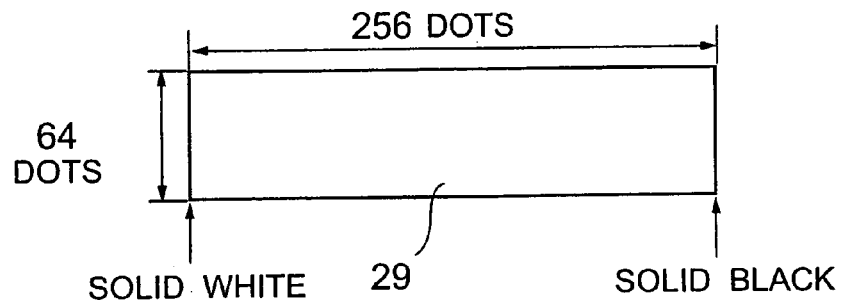
FIG. 44 is a schematic plan view of a test image in which gradation is continuously changed.
Figure 45:
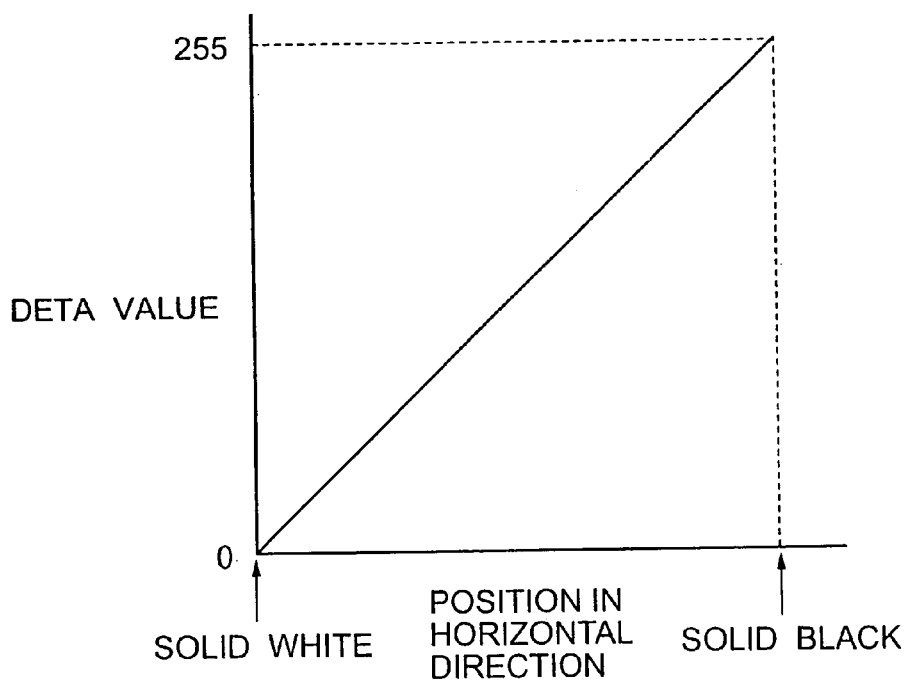
FIG. 45 is a diagram showing distribution of data values of the test image shown in FIG. 44.
Figure 46:
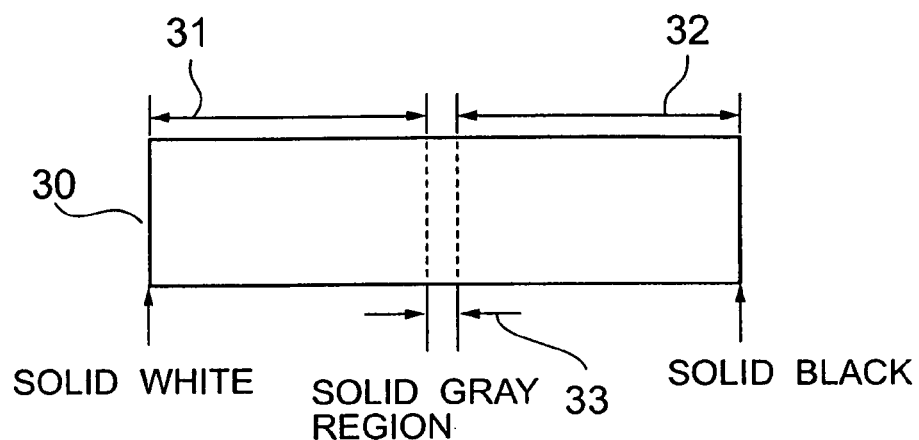
FIG. 46 is a schematic plan view of a reproduced image obtained by printing the test image shown in FIG. 44 by basic techniques of a error diffusion method.

As input image data IN, with respect to this embodiment mode, data on a test image, such as that shown in FIG. 44, having continuous gradation from solid black to solid white, is examined. Corrected data MI is the result of addition of corrected error ME to the input image data IN. The corrected data MI is 3-valued by being compared with thresholds values T1 and T2. As a form of the threshold values, a form of monotonously increasing with the input image data is used by way of example. However, the interval between the two threshold values is essential and the threshold values of the present invention are not limited to this example.

FIG. 5 is a dot distribution diagram showing a distribution of black dots BL, gray dots GR, and white dots WH based on the parameters shown in FIG. 4.

An image having pixels defined by 256 values in the horizontal direction and by 64 values in the vertical direction, having gradation such that successive changes in pixel value are exhibited as 0→255 in the horizontal direction, and having the constant pixel value in the vertical direction was used, 3-valuing processing was performed on this image, and the number of pixels at each pixel value was counted and summed up in the vertical direction.

As shown in FIG. 4, the interval between the threshold values T1 and T2 is set so that variations in corrected data MI with an amplitude in the vertical direction (same as the amplitude of corrected error ME) spike outward beyond the two sets of threshold values T1 and T2. The effect of this setting is that, at the halftone gradation of corrected data MI, black below the threshold value T1, gray between the threshold values T1 and T2, and white above the threshold value T2 are suitably distributed.

Thus, vibration appears even at the halftone gradation of corrected data MI, that is, at the halftone gradation of corrected data MI, generation of a transient region where addition of corrected error ME is not effected and no vibration of corrected error ME is exhibited is prevented.

Consequently, as shown in the dot distribution diagram of FIG. 5, black dots BL, gray dots GR, and white dots WH are suitably mixed at the halftone gradation, so that no solid gray is generated and continuous reproduced gradation is realized.

[Embodiments]

Embodiments of the present invention will be described in comparison with Comparative Examples.

Embodiment 1

Figure 6:
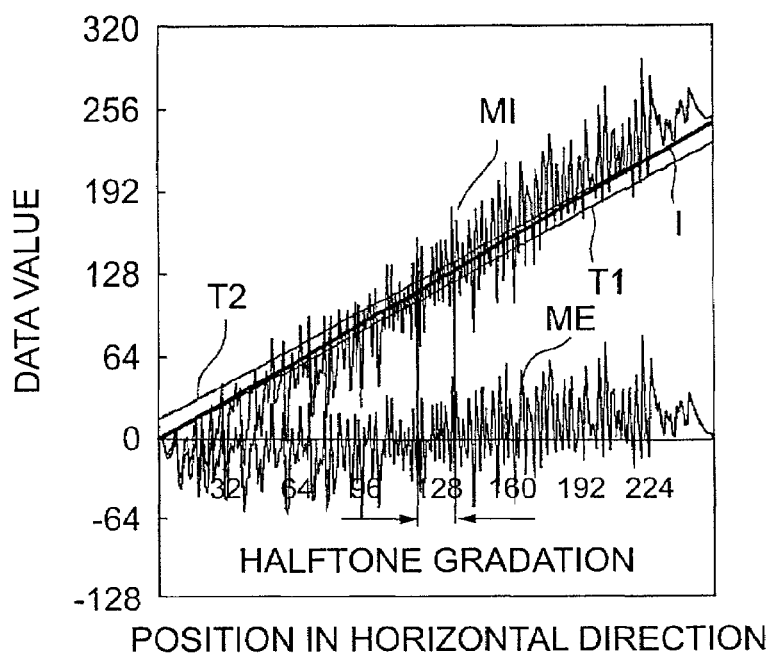
FIG. 6 is a graph for explaining threshold values, corrected errors, corrected data, etc., of the continuous tone image gradation reproduction apparatus in example 1 of the present invention.

Embodiment 1 will be described with reference to FIGS. 6, 7 and 1.

Figure 7:
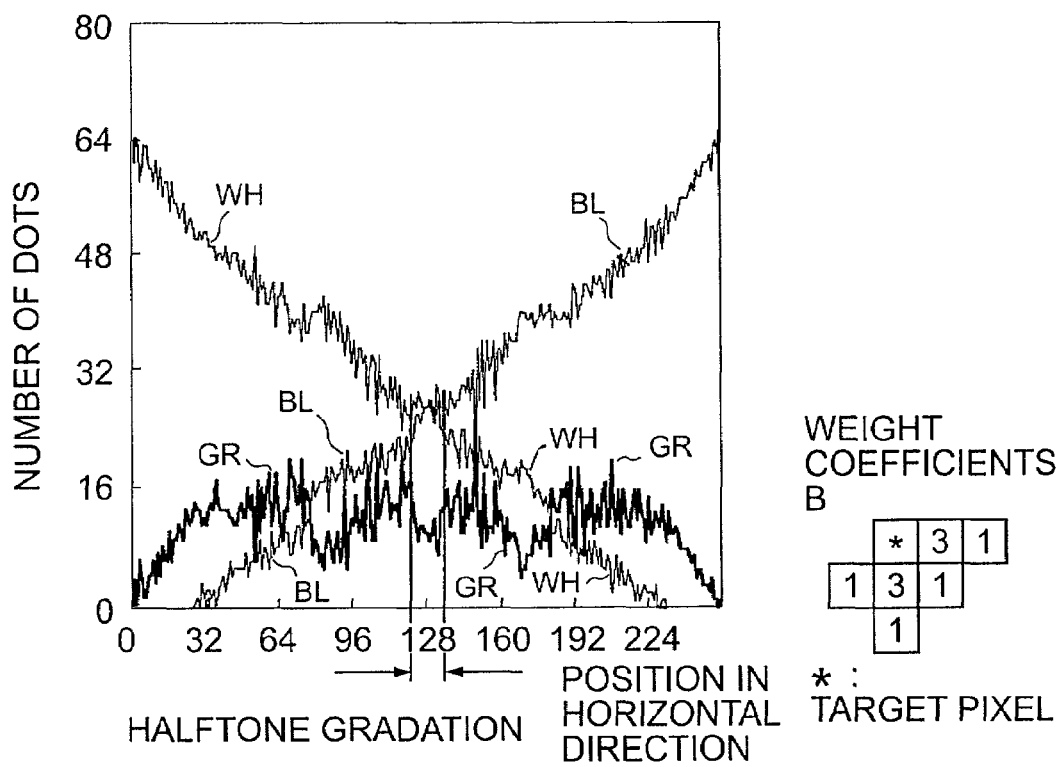
FIG. 7 is a graph showing a dot distribution obtained by the operation with the parameters shown in FIG. 6.

In Embodiment 1, the weight coefficients are in a configuration A shown in FIG. 7, and the number of neighbor pixels to which an error is spread is 6 (an asterisk denotes a target pixel). The amplitude of corrected error ME depends on the configuration of the weight coefficients A. If the number of neighbor pixels to which an error is spread is comparatively small as in the case of the weight coefficients A, the amplitude of the corrected error ME is comparatively large, as shown in FIG. 6.

In the threshold LUT 11 (see FIG. 1), two sets of threshold values T1 and T2 are set so that the interval therebetween is constant and is sufficiently smaller than the amplitude of corrected data MI (same as the amplitude of corrected error ME).

In this case, the interval between the threshold values T1 and T2 is smaller than the amplitude of corrected data MI at the halftone gradation, and 3-valuing is performed so that black, gray and white are suitably distributed at the halftone gradation, thereby preventing generation of a transient region (see symbol TR in FIG. 10) where the amplitude is excessively small at the halftone gradation of corrected data MI.

Consequently, as shown in FIG. 7, black dots BL, gray dots GR, and white dots WH are suitably mixed at the halftone gradation, so that no solid gray is generated and continuous reproduced gradation is realized.

In Embodiment 1, however, the amplitude of corrected data ME is larger than the interval between the threshold values T1 and T2, in contrast with that in the embodiment mode shown in FIGS. 4 and 5. Therefore, the proportion of gray dots GR in Embodiment 1 shown in FIG. 7 is smaller than that of the gray dots GR in the above-described embodiment mode shown in FIG. 5. Since the proportion of gray dots GR is somewhat reduced, it can be said that the effect of Embodiment 1 in terms of effective use of gray dots is slightly lower than that in the above-described implementation mode.

Embodiment 2

Embodiment 2 will be described with reference to FIGS. 8 and 9.

Figure 8:
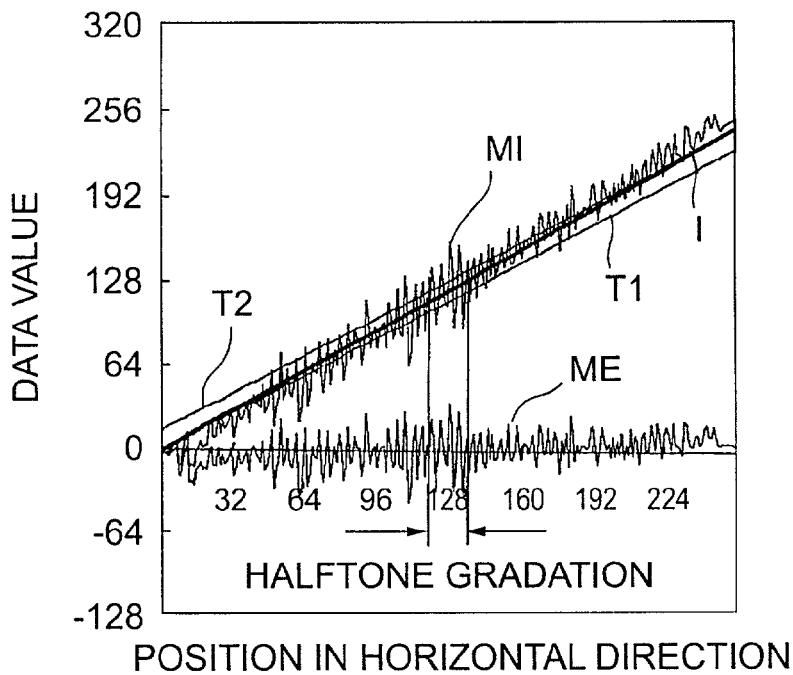
FIG. 8 is a graph for explaining threshold values, corrected errors, corrected data, etc., of the continuous tone image gradation reproduction apparatus in example 2 of the present invention.
Figure 9:
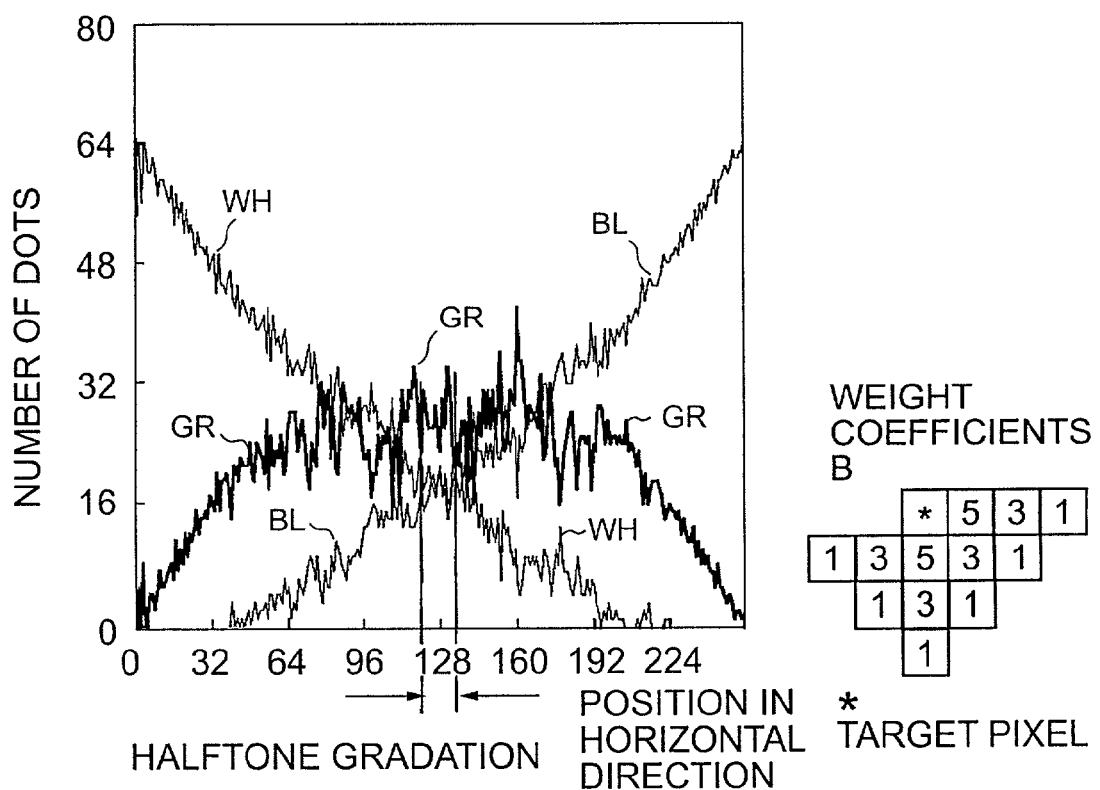
FIG. 9 is a graph showing a dot distribution obtained by the operation with the parameters shown in FIG. 8.

In Embodiment 2, the weight coefficients are in a configuration B shown in FIG. 9, and the number of neighbor pixels to which an error is spread is 12. If, as in the case of the weight coefficients B, the number of neighbor pixels to which an error is spread is larger than that in the case of the weight coefficients A in Embodiment 1, the amplitude of corrected error ME shown in FIG. 8 is smaller than that in Embodiment 1 (see FIG. 6). On the other hand, the interval between the two sets of threshold values T1 and T2 is the same as that in Embodiment 1 (see FIG. 6), as shown in FIG. 8.

In Embodiment 2, as shown in FIG. 8, the interval between the two sets of threshold values T1 and T2 is smaller than the amplitude of corrected data MI, and no transient region (see symbol TR in FIG. 10) is generated at the halftone gradation. Therefore, as shown in FIG. 9 black dots BL, gray dots GR, and white dots WH are suitably mixed at the halftone gradation, so that no solid gray is generated and continuous reproduced gradation is realized.

A sufficiently large number of gray dots GR also exist and the gradation reproducibility is high.

COMPARATIVE EXAMPLE 1

A Comparative Example 1 will be described with reference to FIGS. 10 and 11.

Figure 10:
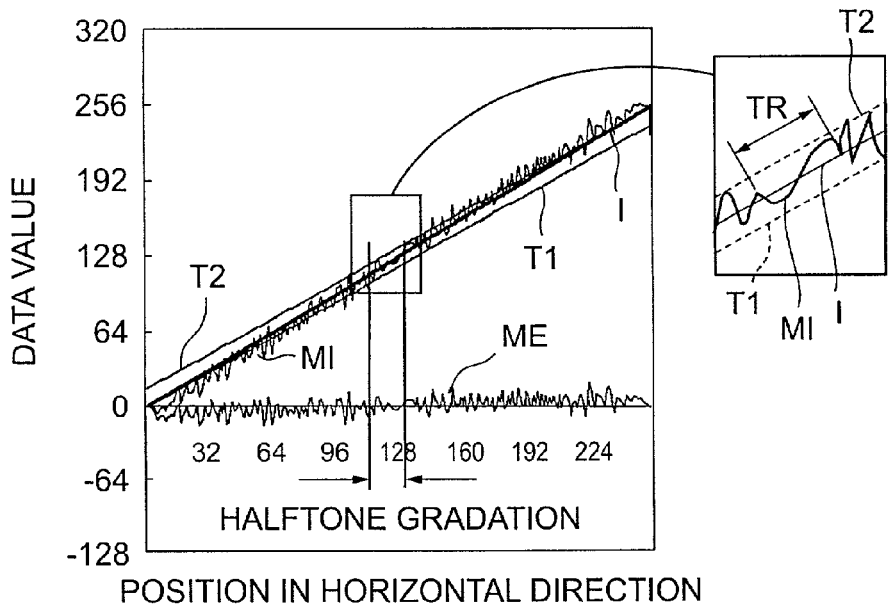
FIG. 10 is a graph for explaining threshold values, corrected errors, corrected data, etc., of the continuous tone image gradation reproduction apparatus in comparative example 1 of the present invention.
Figure 11:
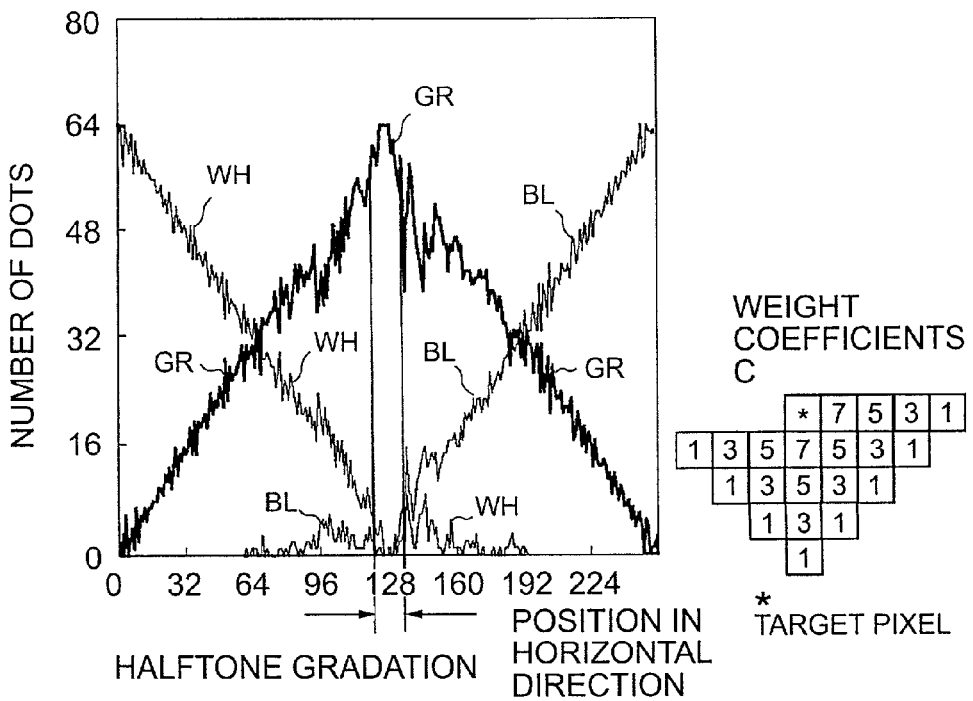
FIG. 11 is a graph showing a dot distribution obtained by the operation with the parameters shown in FIG. 10.

In Comparative Example 1, the weight coefficients are in a configuration C shown in FIG. 11, and the number of neighbor pixels to which an error is spread is 20. If, as in the case of the weight coefficients C, the number of neighbor pixels to which an error is spread is larger than that in the case of the weight coefficients B in Embodiment 2, the amplitude of corrected error ME is further smaller than that in Embodiment 2 (see FIG. 8), as shown in FIG. 10.

On the other hand, the interval between threshold values T1 and T2 is set to the same value as those in Embodiment 1 (see FIG. 6) and Embodiment 2 (see FIG. 8).

In Comparative Example 1, the amplitude of corrected error ME is very small, and as shown in FIG. 10, the interval between threshold values T1 and T2 is excessively large in comparison with the amplitude of corrected error ME. Therefore, a transient condition TR occurs in which only gray between threshold values T1 and T2 appears at the halftone gradation while no black below threshold value T1 and no white above threshold value T2 are seen. Consequently, as shown in FIG. 11, dots existing at the halftone gradation are mainly gray dots GR and include substantially no black dots BL and substantially no white dots WH, so that solid gray occurs and there is a discontinuity in the reproduced gradation.

From a comparison between the above-described Embodiments 1 and 2 and the above-described Comparative Example 1, the following has been confirmed.

The amplitude of corrected error ME depends on the configuration of weight coefficients A, B, or C.

Also, if the interval between threshold values T1 and T2 is reduced relative to the amplitude of corrected data MI, no transient region TR is generated at the halftone gradation, so that the reproduced gradation is continuous. On the other hand, if the interval between threshold values T1 and T2 is increased relative to the amplitude of corrected data MI, a transient region TR is generated at the halftone gradation, so that the reproduced gradation is discontinuous.

Embodiment 3

Embodiment 3 will be described with reference to FIGS. 12 and 13.

Embodiment 3 relates to a case where the interval between threshold values T1 and T2 is excessively small in comparison with the amplitude of corrected error ME.

Figure 12:
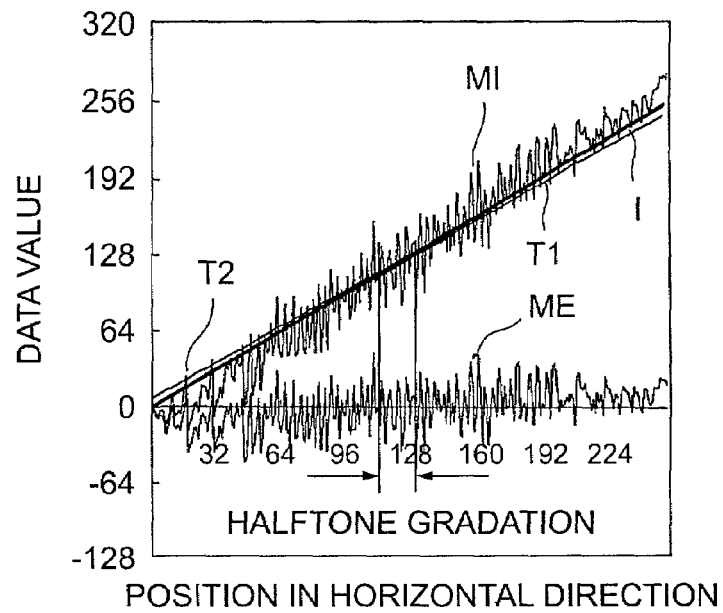
FIG. 12 is a graph for explaining threshold values, corrected errors, corrected data, etc., of the continuous tone image gradation reproduction apparatus in example 3 of the present invention.
Figure 13:
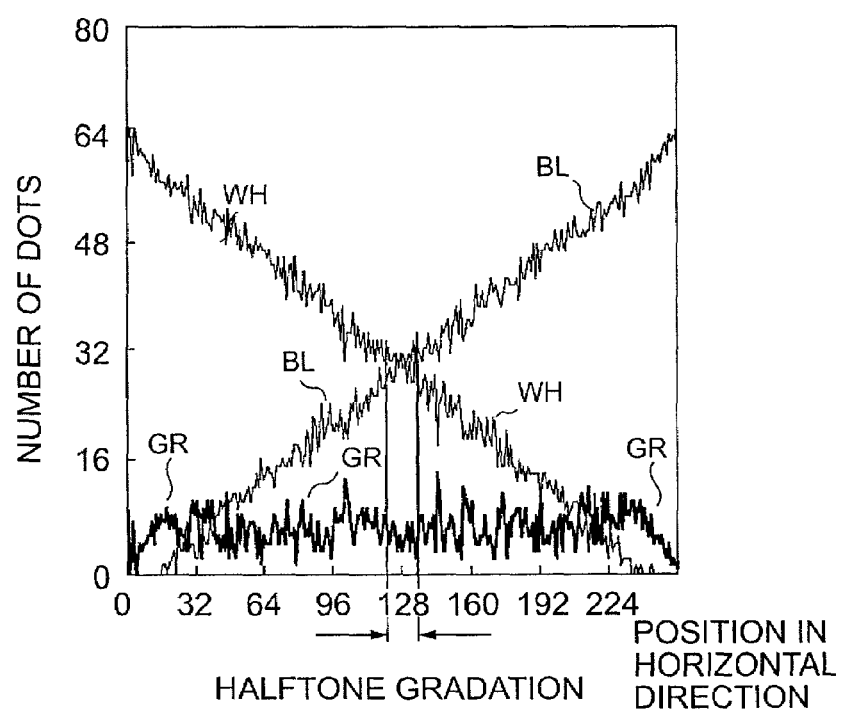
FIG. 13 is a graph showing a dot distribution obtained by the operation with the parameters shown in FIG. 12.

In Embodiment 3, as shown in FIG. 12, the interval between threshold values T1 and T2 is excessively small in comparison with the amplitude of corrected error ME, and therefore, no transient condition TR (see FIG. 10) similar to that in Comparative Example 1 occurs.

However, since the interval between threshold values T1 and T2 is excessively small, substantially no gray between threshold values T1 and T2 appears, and mainly black and white outside threshold values T1 and T2 appear. For this reason, as shown in FIG. 13, black dots BL and white dots WH at the halftone gradation are excessively increased while gray dots GR are scarce.

In Embodiment 3, the interval between threshold values T1 and T2 is further reduced relative to the amplitude of corrected data MI and in comparison with that in Embodiment 1. Therefore, the gradation reproducibility is further reduced in comparison with Embodiment 1.

In Embodiment 2, in contrast with Embodiment 3 and Embodiment 1, the interval between threshold values T1 and T2 is suitably set without being excessively reduced relative to the amplitude of corrected error ME, thereby suitably mixing black, white and gray at the halftone gradation.

From Embodiments 1 to 3, it has been conformed that it is preferable to set the interval between threshold values T1 and T2 to a value large enough to maintain a suitable amount of gray necessary for obtaining favorable gradation reproducibility.

Embodiment 4

Embodiment 4 will be described with reference to FIGS. 14 and 15.

Figure 14:
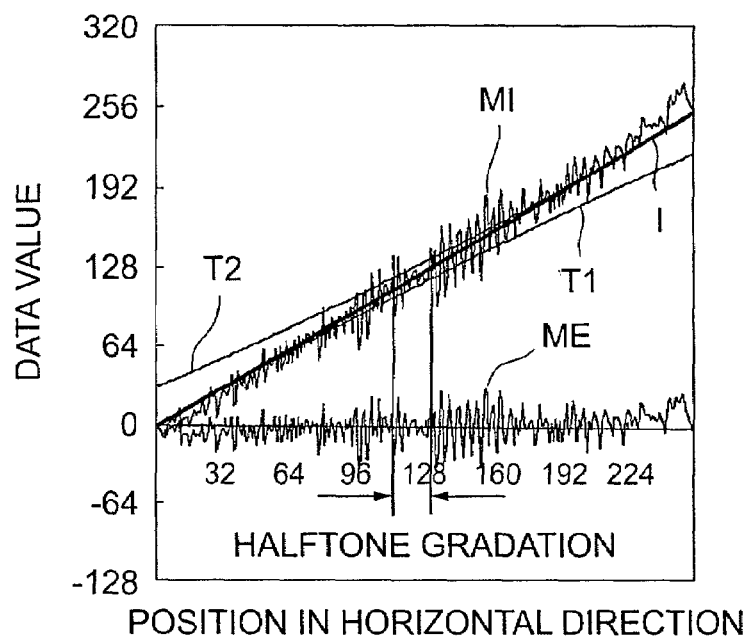
FIG. 14 is a graph for explaining threshold values, corrected errors, corrected data, etc., of the continuous tone image gradation reproduction apparatus in example 4 of the present invention.
Figure 15:
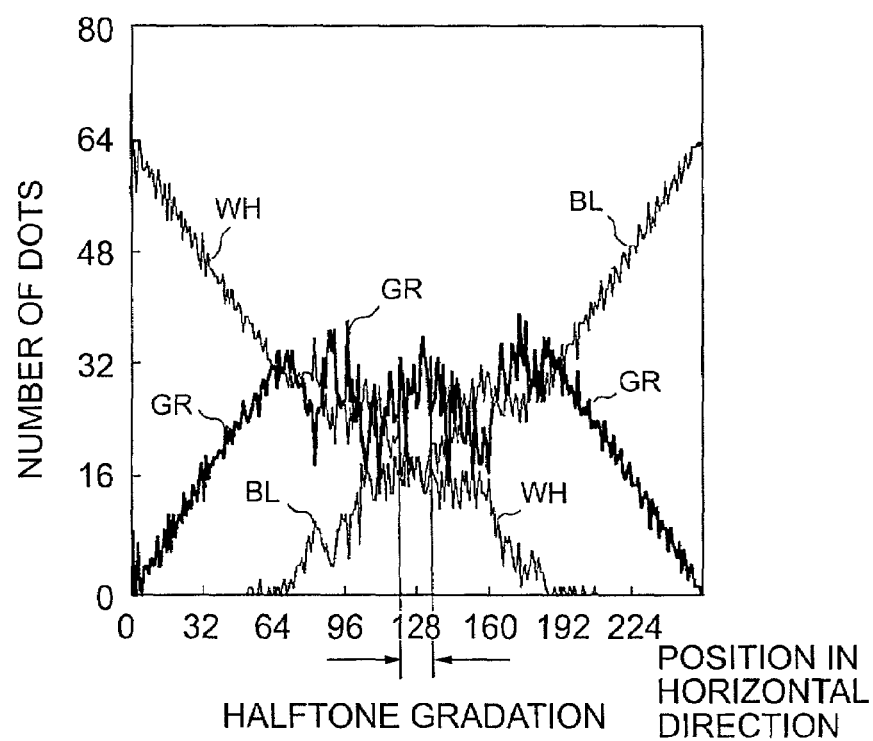
FIG. 15 is a graph showing a dot distribution obtained by the operation with the parameters shown in FIG. 14.

In Embodiment 4, as shown in FIG. 14, the interval between threshold values T1 and T2 is set as defined by curved lines which are substantially largely spaced apart at the opposite ends corresponding to the black gradation and the white gradation, but which are brought closer to each other at the center corresponding to the halftone gradation.

In Embodiment 4, the interval between threshold values T1 and T2 is smaller than the amplitude of corrected error ME at the halftone gradation. Therefore, no transient region is generated, black dots BL, white dots WH and gray dots GR are suitably mixed, and the reproduced gradation is continuous, as shown in FIG. 15.

COMPARATIVE EXAMPLE 2

Comparative Example 2 will be described with reference to FIGS. 16 and 17.

Figure 16:
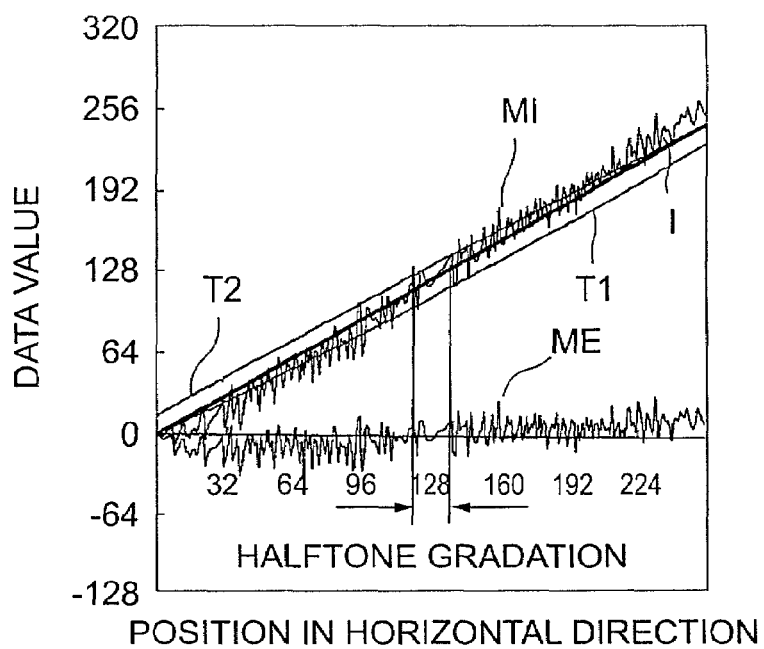
FIG. 16 is a graph for explaining threshold values, corrected errors, corrected data, etc., of the continuous tone image gradation reproduction apparatus in comparative example 2 of the present invention.
Figure 17:
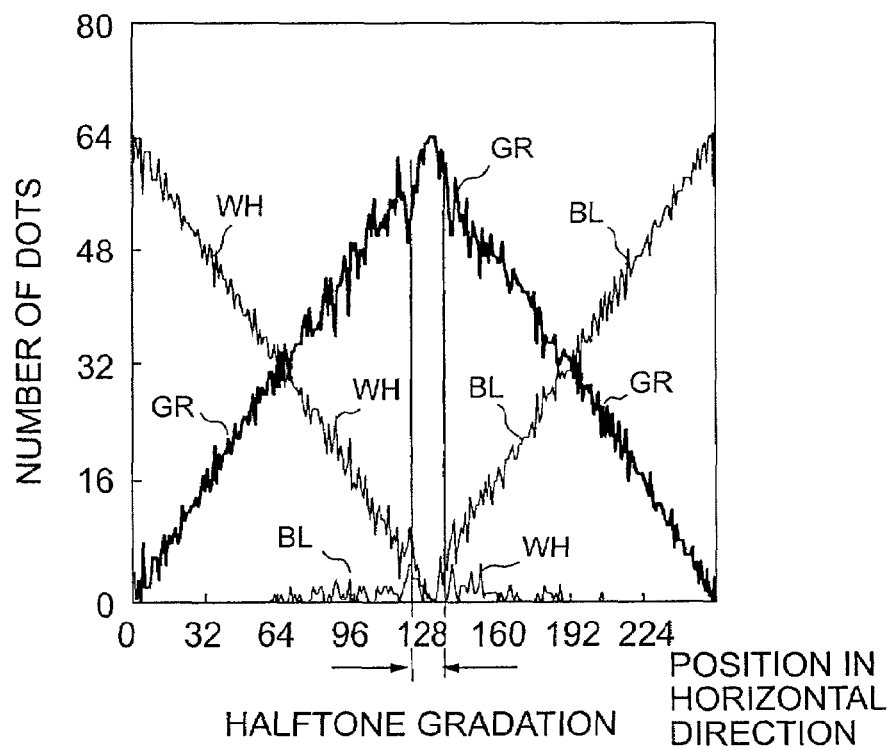
FIG. 17 is a graph showing a dot distribution obtained by the operation with the parameters shown in FIG. 16.

In Comparative Example 2, as shown in FIG. 16, the interval between threshold values T1 and T2 is set as defined by lines curved reversely relative to those in Embodiment 4, that is, the interval between threshold values T1 and T2 is maximized at the center corresponding to the halftone gradation, and is minimized at the opposite ends corresponding to the black gradation and the white gradation.

In Comparative Example 2, the interval between threshold values T1 and T2 is larger than the amplitude of corrected error ME at the halftone gradation. Therefore, a transient region TR is generated, mainly gray GR appears alone at the halftone gradation, and there is a discontinuity in gradation, as shown in FIG. 17.

From Embodiment 4 and Comparative Example 2, it has been confirmed that it is necessary to reduce the interval between threshold values T1 and T2 relative to the amplitude of corrected error ME at the halftone gradation, but the realization of continuous gradation is irrelevant to whether the interval between threshold values T1 and T2 is larger or smaller than the amplitude of corrected error ME at the opposite ends corresponding to the solid black and the solid white.

Embodiment 5

A description will now be made particularly on reproduction of the halftone gradation from constant-value image data. A case of 3-valuing input image data on each of pixels of a test image 30 shown in FIG. 18 will be described.

Figure 18:
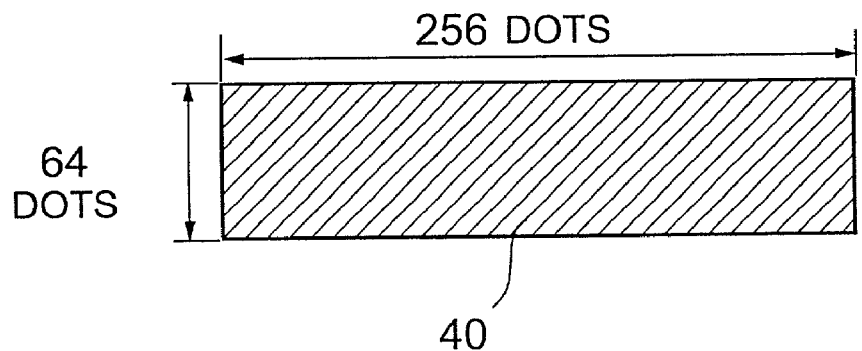
FIG. 18 is a schematic plan view of a test image in which all pixel values correspond to the halftone gradation.

FIG. 18 is a plan view of a test image 40. The test image 40 has a 256 by 64 matrix of dots, and the values of all the pixels are the same and correspond to the halftone gradation, that is, the pixel value is set to a constant value of 128.

Figure 19:
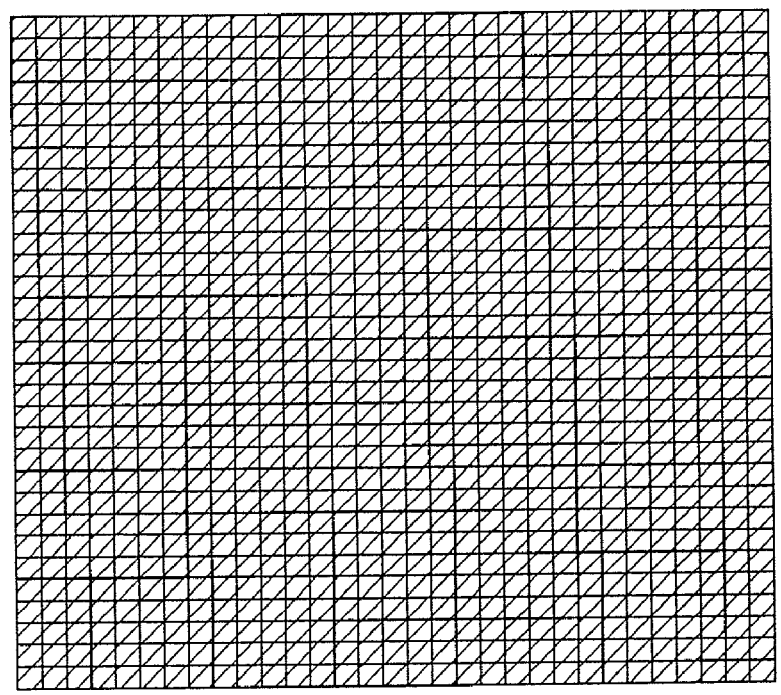
FIG. 19 is a plan view showing an example of 3-valuing of the test image shown in FIG. 6.

FIG. 19 shows an area formed by 32×32 pixels when the test image 40 shown in FIG. 18 is 3-valued. In FIG. 19, a hatched pixel corresponds to a gray dot [1]. That is, an image having a constant value corresponding to the halftone gradation is expressed by gray dots [1] alone to have a result different from a mixture of white dots [0], gray dots [1] and black dots [2] in a continuous-gradation image.

Figure 20:
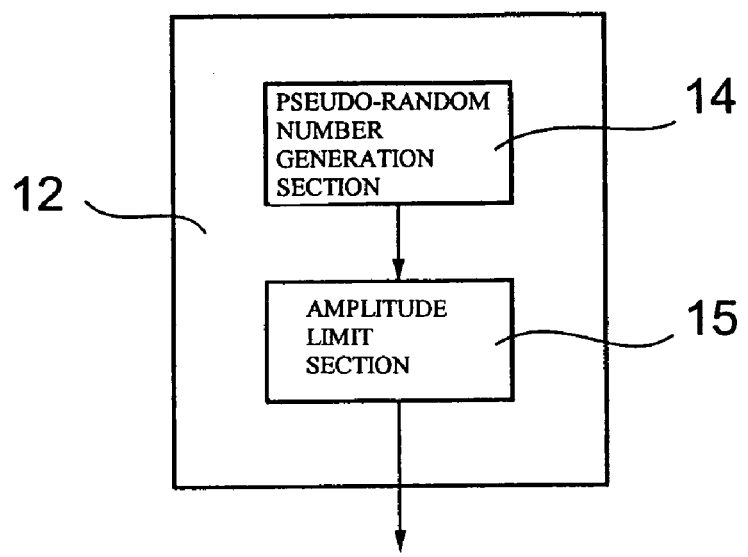
FIG. 20 is a block diagram showing the configuration of a pseudo-random number section.

According to the present invention, therefore, pseudo-random numbers are added to input image data before the image data is processed by the same process described above. First, referring to FIG. 1, a pseudo-random number section 12 is provided to obtain pseudo-random numbers FN. FIG. 20 is a block diagram showing the configuration of the pseudo-random number section 12. The pseudo-random number section 12 is constituted of a pseudo-random number generation section 14 and an amplitude limit section 15. A well-known method for generating pseudo-random numbers may be used as a method of generating pseudo-random numbers in the pseudo-random number generation section 14. The maximum amplitude of generated pseudo-random numbers is limited in the amplitude limit section 15.

Pseudo-random numbers obtained in the pseudo-random number section 12 are added to input image data IN by the adder A13. The input image data to which the pseudo-random numbers have been added thereafter undergoes the same process to be 3-valued.

Figure 21:
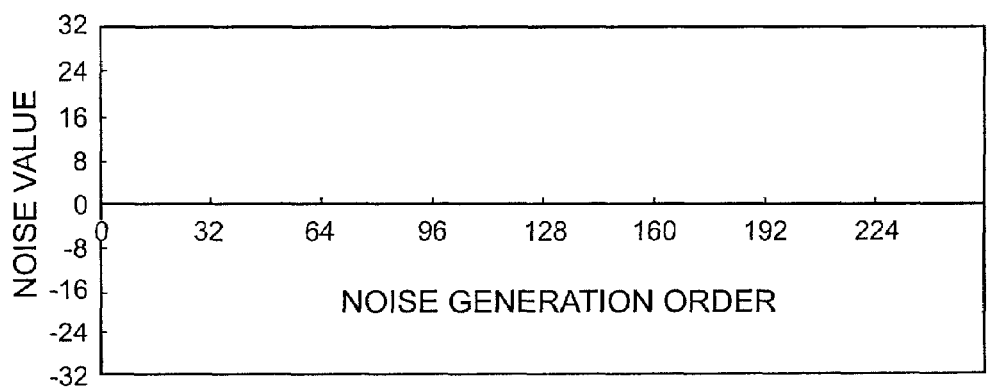
FIG. 21 is a diagram showing pseudo-random numbers generated by the pseudo-random number section.
Figure 22:
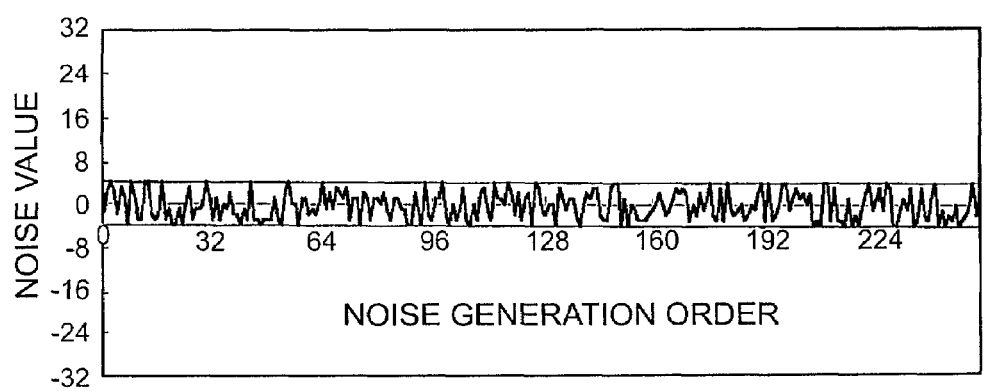
FIG. 22 is a diagram showing pseudo-random numbers generated by the pseudo-random number section.
Figure 23:
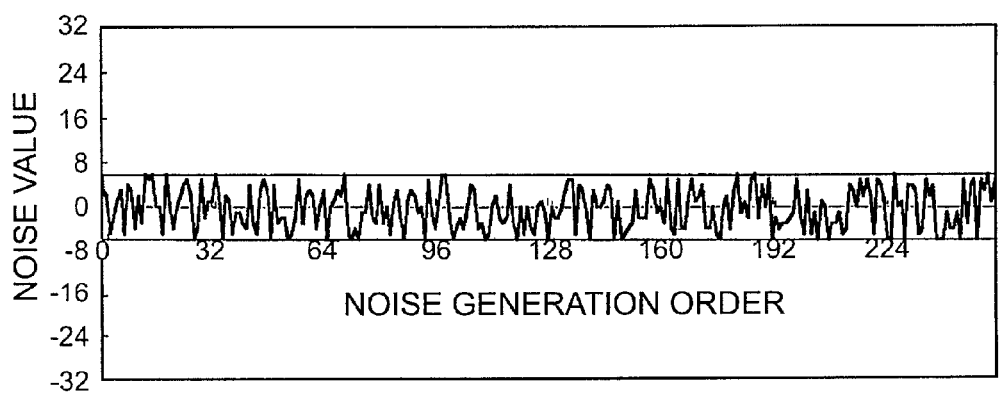
FIG. 23 is a diagram showing pseudo-random numbers generated by the pseudo-random number section.
Figure 24:
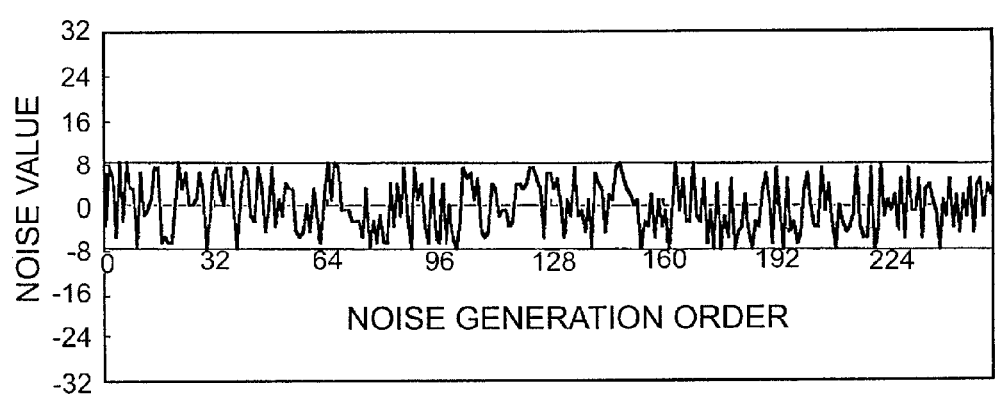
FIG. 24 is a diagram showing pseudo-random numbers generated by the pseudo-random number section.

FIGS. 21 through 24 are diagrams for explaining pseudo-random numbers generated in the pseudo-random number section. The abscissa represents the order of generation of pseudo-random numbers, and the ordinate represents the values of pseudo-random numbers. FIG. 21 shows a case where the maximum amplitude is 0, that is, there are no pseudo-random numbers; FIG. 22 shows a case where the maximum amplitude is 4; FIG. 23 shows a case where the maximum amplitude is 6; and FIG. 24 shows a case where the maximum amplitude is 8. The amplitude referred to in this description is the maximum of the distance from the center of vibration to peaks of vibration. In each of these figures, a wiggly line indicates the maximum amplitude. In these cases, pseudo-random numbers are generated substantially randomly with amplitudes within the limits of the maximum amplitude.

The limitation of the amplitude in the amplitude limit section may be performed based on a known method, e.g., a method of dividing pseudo-random numbers generated in the pseudo-random number generation section by the value of the limit amplitude, and removing the remainder. In this case, the positive/negative of the original pseudo-random numbers is preserved through the amplitude limiting processing.

Figure 25:
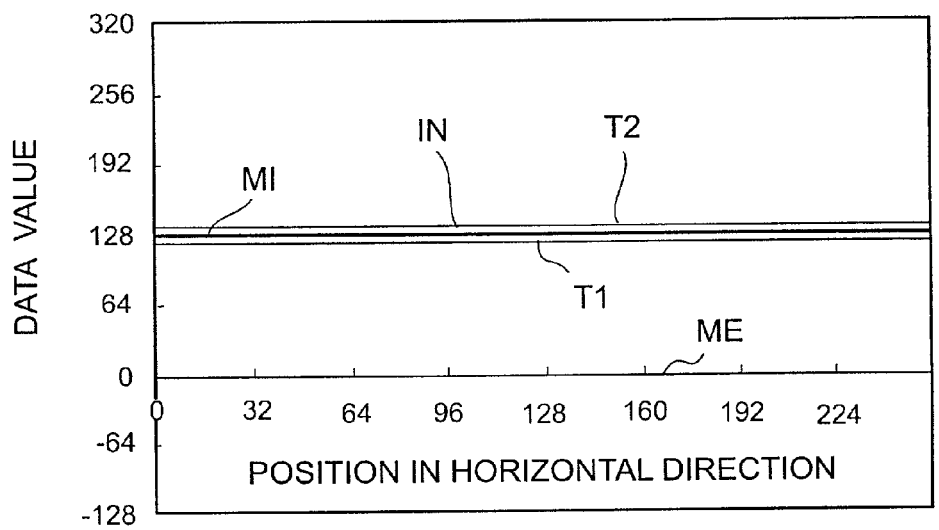
FIG. 25 is a graph for explaining the relationship between parameters with respect to the test image shown in FIG. 18.

FIGS. 25 through 28 are graphs for explaining various parameters in the 3-valuing processing means 4 (see FIG. 1) with respect to the image 30, as is FIG. 4. FIG. 25 shows a case where the amplitude of pseudo-random numbers is zero, that is, no pseudo-random numbers are added. In this case, all the values are steady and corrected data MI is always within the range between threshold values T1 and T2, so that only gray dots [1] are outputted. Threshold values T1 and T2 are also variable with respect to input image data, as are those in the case shown in FIG. 4. However, since the input image data is constant, threshold values T1 and T2 shown in FIG. 25 are also fixed.

Figure 26:
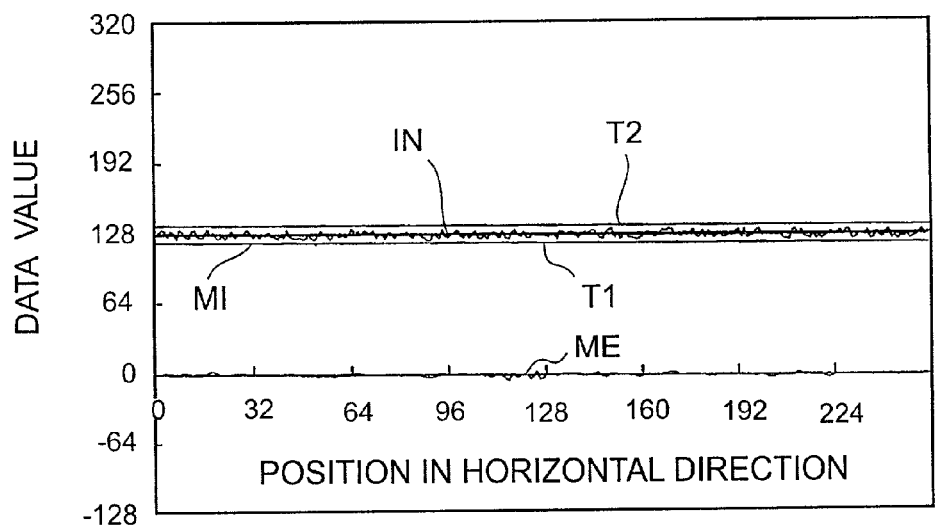
FIG. 26 is a graph for explaining the relationship between parameters with respect to the test image shown in FIG. 18.
Figure 27:
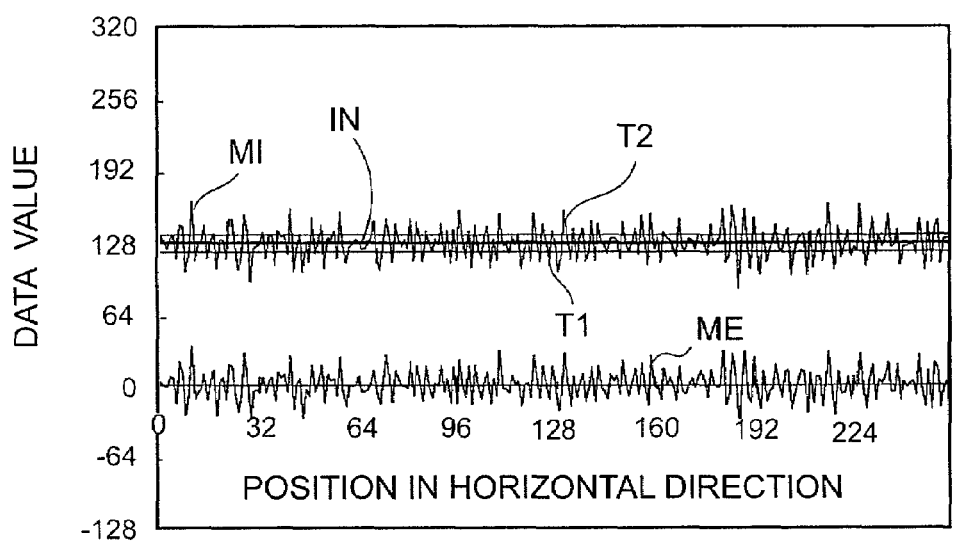
FIG. 27 is a graph for explaining the relationship between parameters with respect to the test image shown in FIG. 18.
Figure 28:
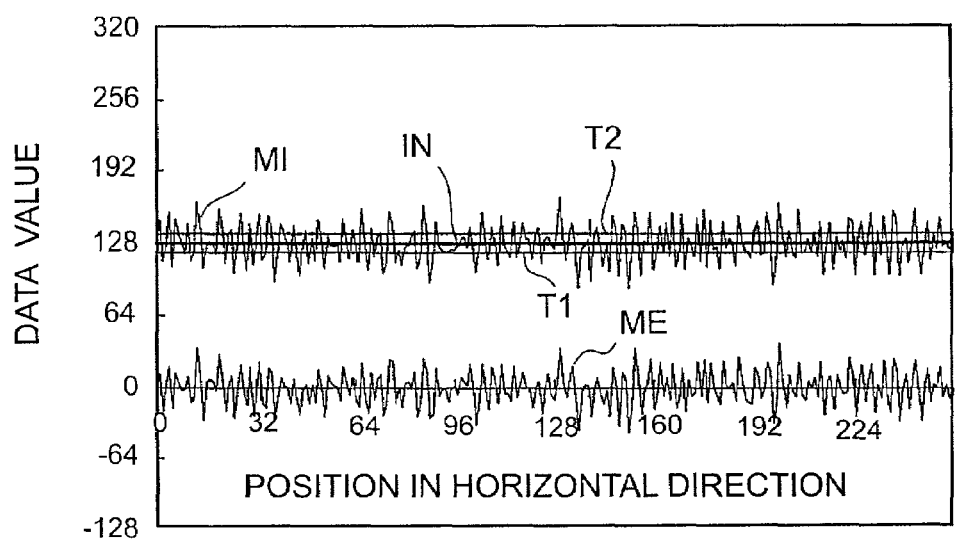
FIG. 28 is a graph for explaining the relationship between parameters with respect to the test image shown in FIG. 18.

FIG. 26 shows a case where the amplitude of pseudo-random numbers is 4, the pseudo-random numbers are added to input image data IN to cause vibration in input image data IN, and vibration is also caused in corrected error ME and corrected data MI. However, since corrected data MI is within the range between threshold values T1 and T2, only gray dots [1] are outputted. FIGS. 27 and 28 respectively show a case where the amplitude of pseudo-random numbers is 6, and a case where the amplitude of pseudo-random numbers is 8. In these case, input image data IN vibrates largely, so that corrected error ME and corrected data MI also vibrate largely. Thus, corrected data MI exceeds threshold values T1 and T2, thereby generating white dots [0] and black dots [2] as well as gray dots [1].

Figure 29:
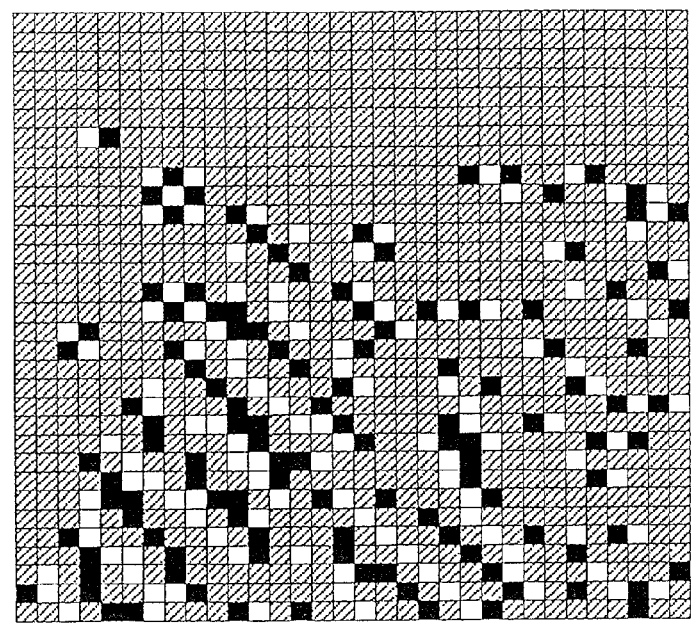
FIG. 29 is a plan view showing another example of 3-valuing of the test image shown in FIG. 18.
Figure 30:
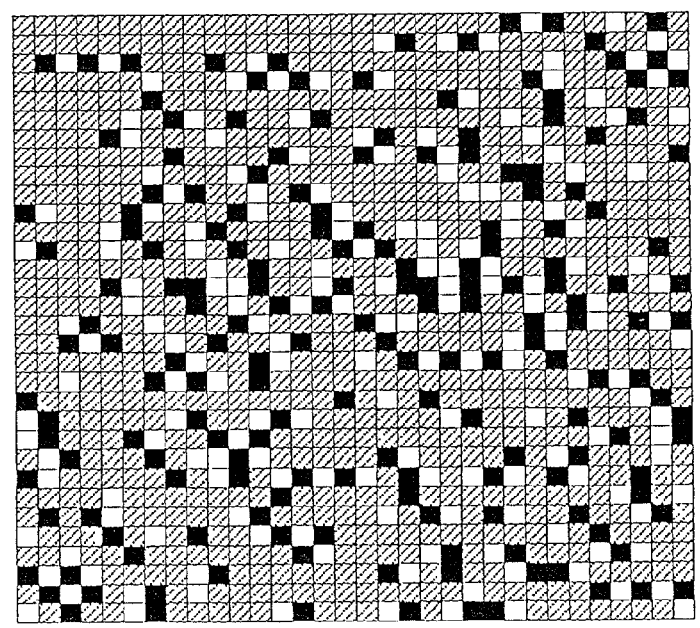
FIG. 30 is a plan view showing another example of 3-valuing of the test image shown in FIG. 18.

FIGS. 29 and 30 show in the 32×32 area the results of 3-valuing of the image shown in FIG. 18 with respect to use of the pseudo-random numbers shown in FIGS. 23 and 24. In these figures, hatched pixels are gray dots [1], pixels shown in white are white dots [0], and pixels shown in black are black dots [2]. Thus, it is possible to generate a mixture of gray dots [1], white dots [0] and black dots [2] by adding pseudo-random numbers of a certain magnitude to input image data. When amplitude 6 shown in FIG. 23 is set, white dots [0] and black dots [2] are unevenly mixed with gray dots [1]. When amplitude 8 shown in FIG. 24 is set, white dots [0] and black dots [2] are suitably mixed with gray dots [1] and the result is similar to that in the case of a continuous-tone image.

Embodiment 6

Figure 31:
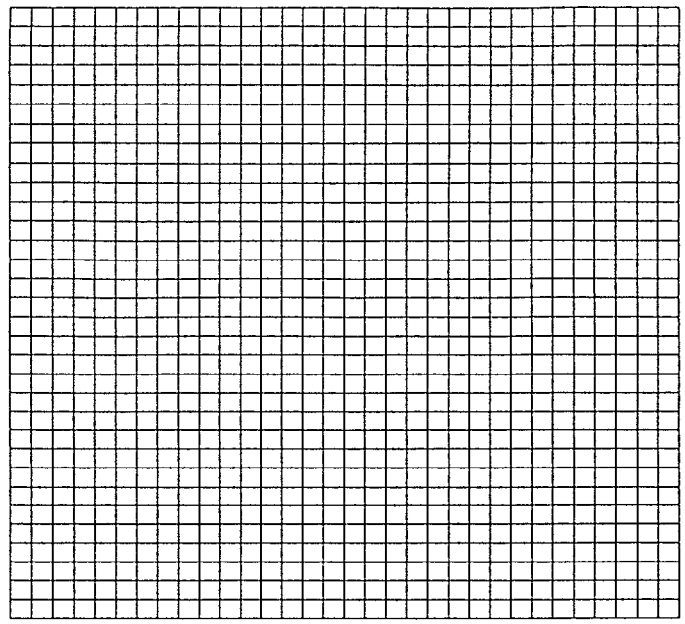
FIG. 31 is a plan view showing an example of 3-valuing of a constant-zero-value test.
Figure 32:
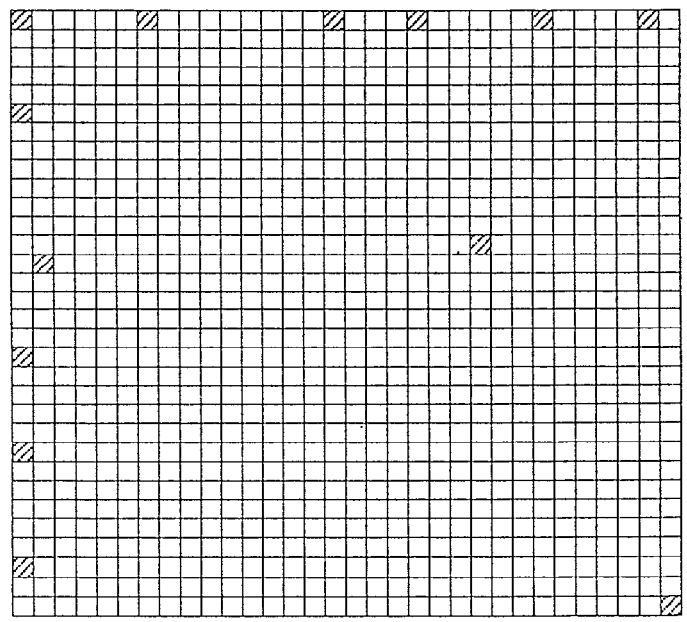
FIG. 32 is a plan view showing another example of 3-valuing of the constant-zero-value test.

FIGS. 31 and 32 show in the 32×32 area the results of 3-valuing of a constant-zero-value image. FIG. 31 shows the result of 3-valuing without adding pseudo-random numbers. In this case, only white dots [0] are generated. FIG. 32 is a plan view of the result in the case where pseudo-random numbers with amplitude 8 are added to input image data. In this case, gray dots [1] are generated among white dots [0]. It is desirable that, after 3-valuing, only white dots [0] should be reproduced with respect to an image originally having only a constant zero value. However, in this embodiment, there is a problem in that unnecessary dots, which may reduce the image quality, are generated as a result of addition of pseudo-random numbers.

Figure 33:
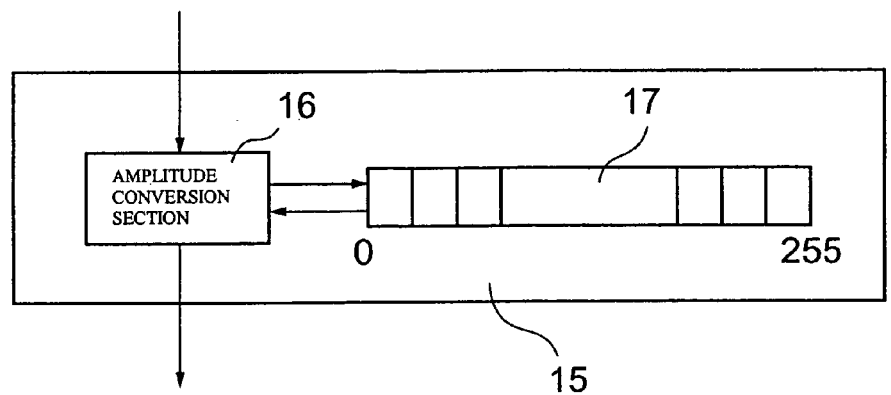
FIG. 33 is a block diagram showing the configuration of a amplitude limit section 15.

Therefore, the present invention is arranged to change the maximum amplitude of pseudo-random numbers according to the value of input image data. When input image data is zero or when the dynamic range of input image is maximum, the value of pseudo-random numbers is set to zero. FIG. 33 is a block diagram showing the configuration of the amplitude limit section 15. The amplitude limit section 15 is constituted of an amplitude conversion section 16 and an amplitude table 17. In the amplitude table 17, the values of limit amplitudes of pseudo-random numbers with respect to the value of input image data are stored. That is, amplitude limit values consisting of 256 values are stored by being respectively related to 256 values, i.e., values 0 to 255 of input image data. In the amplitude conversion section 16, the amplitude of pseudo-random numbers is converted by using a limit amplitude value obtained by referring to the amplitude table 17 based on the value of the input image data.

Figure 35:
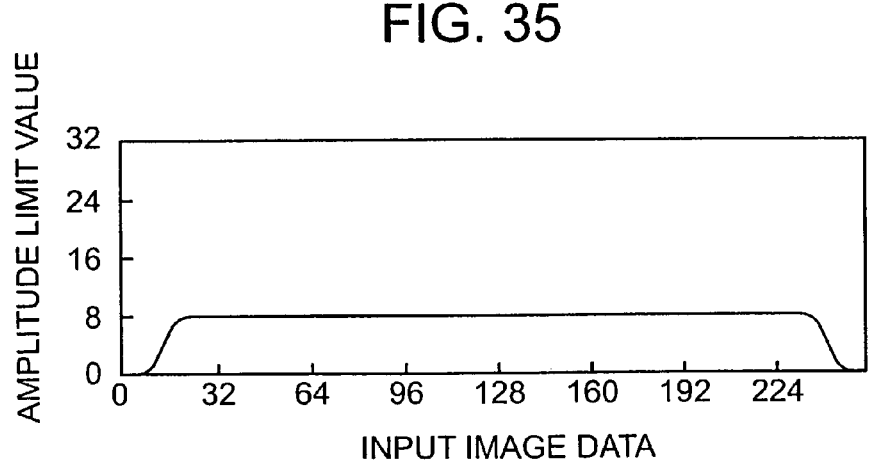
FIG. 35 is a block diagram showing another example of an amplitude table.
Figure 34:
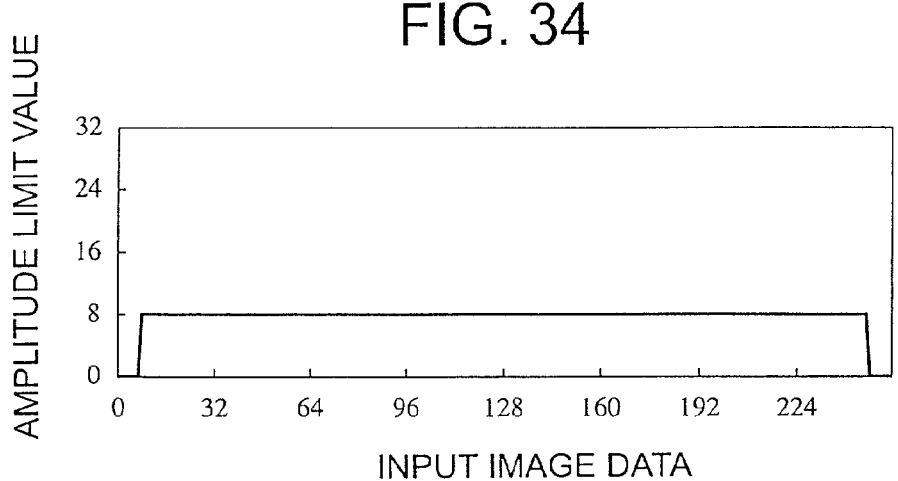
FIG. 34 is a block diagram showing an example of an amplitude table.

FIGS. 34 and 35 are diagrams showing examples of the amplitude table. The abscissa represents the value of input image data, and the ordinate represents the amplitude limit value. Referring to FIG. 34, in regions of width 8 with respect to 0 to 7 and 248 to 255 of input image data, the amplitude limit value is zero, that is, there are no pseudo-random numbers. In the other region, the amplitude limit value is 8 and the maximum of pseudo-random numbers is 8. In this case, with respect to the above-mentioned constant-zero-value image, no pseudo-random numbers are generated and a reproduction result, such as shown in FIG. 31, is obtained. Unnecessary dots are not generated. The amplitude shown in FIG. 34 or the like entails the problem in that pseudo-random numbers are abruptly generated at a certain gradation step in a continuous-gradation image to cause a discontinuity in gradation reproduction. FIG. 35 is a diagram for explaining another example of the amplitude table. In the case shown in FIG. 35, at the maximum and at the minimum of the possible value of input image data, the amplitude of pseudo-random numbers is zero, and the vibration value and the inclination are continuously changed from each of these points. Therefore, no discontinuity is caused even when a continuous-gradation image is reproduced. Also, an image can be reproduced without occurrence of unnecessary dots.

If pseudo-random numbers having such amplitude-limited characteristics are added to input image data, halftone gradation data can be reproduced so that white dots [0], gray dots [1] and black dots [2] exist mixedly, the gradation can be smoothly expressed, and, with respect to expression of solid white or solid black, reproduction of unnecessary dots is prevented. Further, a continuous-gradation image can be reproduced without a discontinuity. Thus, improved gradation reproduction can be achieved.

Embodiment 7

Figure 39:
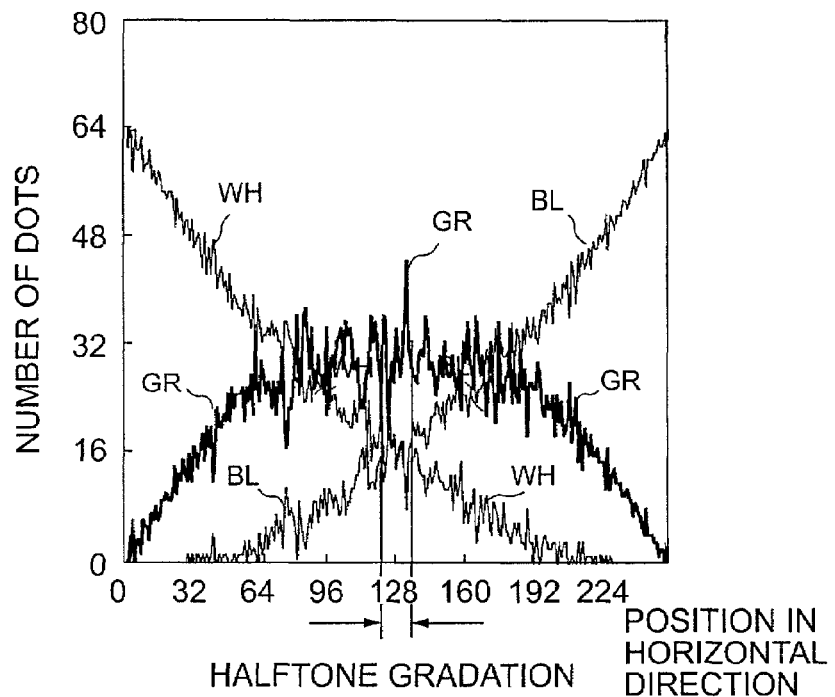
FIG. 39 is a graph showing a dot distribution.
Figure 40:
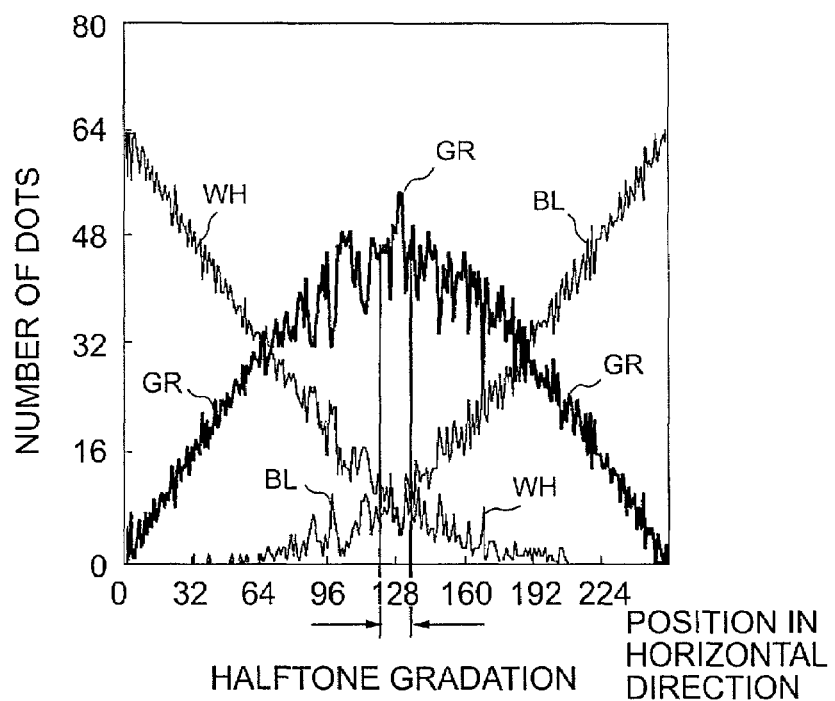
FIG. 40 is a graph showing a dot distribution.
Figure 41:
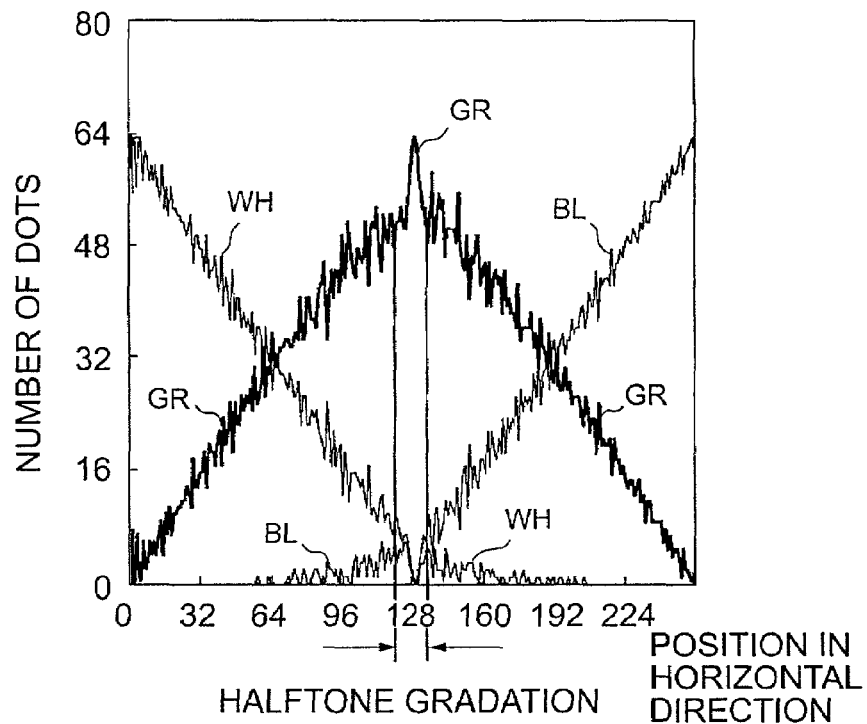
FIG. 41 is a graph showing a dot distribution.
Figure 47:
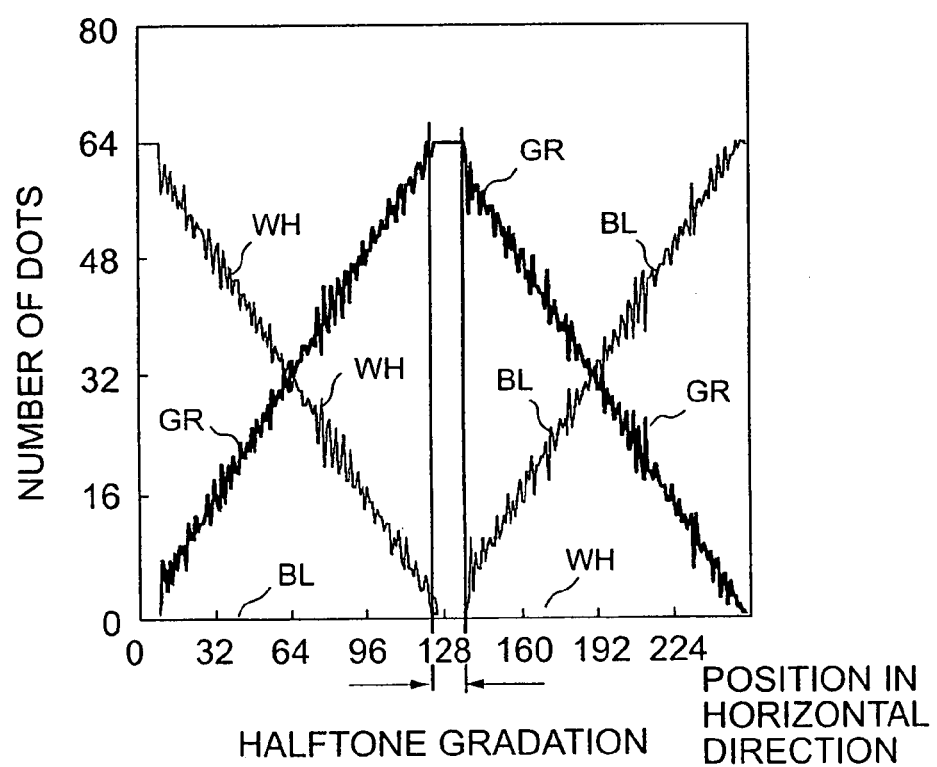
FIG. 47 is a dot distribution diagram of the test image shown in FIG. 44.

In a portion having the halftone gradation, the proportions of white dots [0], gray dots [1] and black dots [2] are changed by selecting the interval between the threshold values, as described above. FIGS. 39, 40, and 41 are dot distribution diagrams similar to FIG. 5, which were obtained by setting threshold value intervals of 18, 24, and 28, respectively. As can be understood from FIG. 5 and FIGS. 39 to 41, the proportion of gray dots [1] in the halftone-gradation portion becomes higher if the interval between the threshold values is increased. Also, the proportion of gray dots [1] in the halftone-gradation portion becomes lower if the interval between the threshold values is reduced. A case where the interval between the threshold values is sufficiently wide corresponds to the conventional error diffusion method extended to 3-valuing as shown in FIG. 47. In such a case, an image portion is formed where only gray dots [1] are formed. A case where there is no interval between the threshold values corresponds to the conventional binary error diffusion method using one threshold value, i.e., a case where no gray dots [1] are formed.

If gradation reproduction is performed by using three kinds of dots: white dots [0], gray dots [1] and black dots [2], it is desirable that, to effectively utilize the existence of gray dots [1], the proportion of gray dots [1] in the halftone-gradation portion is increased as high as possible, and that occurrence of a solid gray region is prevented as in the case of the conventional error diffusion method expended to 3-valuing. In order to attain this, it is necessary to set the proportion of the gray dots [1] to a value close to 100% and equal to or smaller than 100%. For example, in the case shown in FIG. 41, among the cases shown in FIGS. 39 to 41, the proportion of gray dots [1] in the halftone-gradation portion is higher. In such a case of the dot proportion, however, the proportion of gray dots [1] in the halftone-gradation portion is so high that the distributions of white dots [0] and black dots [2] break and a discontinuity of the gradation can be felt. Thus, this setting is unfavorable.

On the other hand, in the error diffusion method, it is difficult to finely control a distribution proportion close to 100% by only changing the threshold value interval. This is because the dot distribution proportion is liable to change abruptly by a small change in the threshold value interval in this region.

Then, according to the present invention, the maximum amplitude of pseudo-random numbers is slightly increased with respect to the median of the dynamic range of the input value or a value close to the median.

Figure 36:
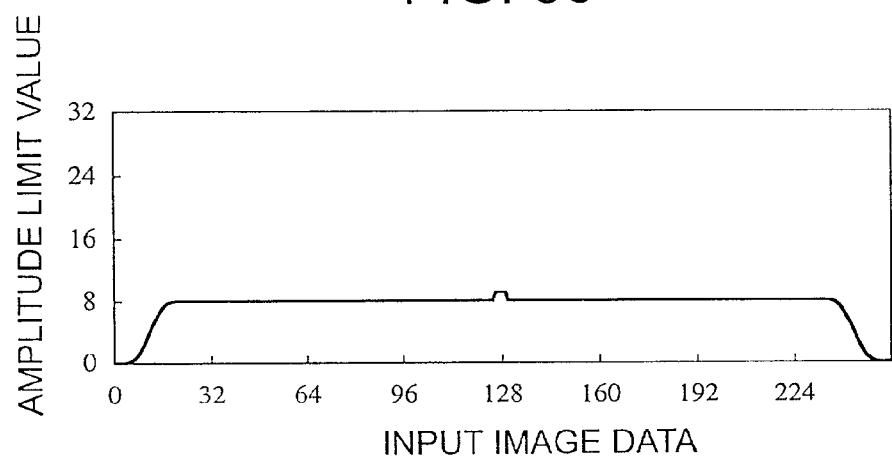
FIG. 36 is a block diagram showing another example of an amplitude table.
Figure 42:
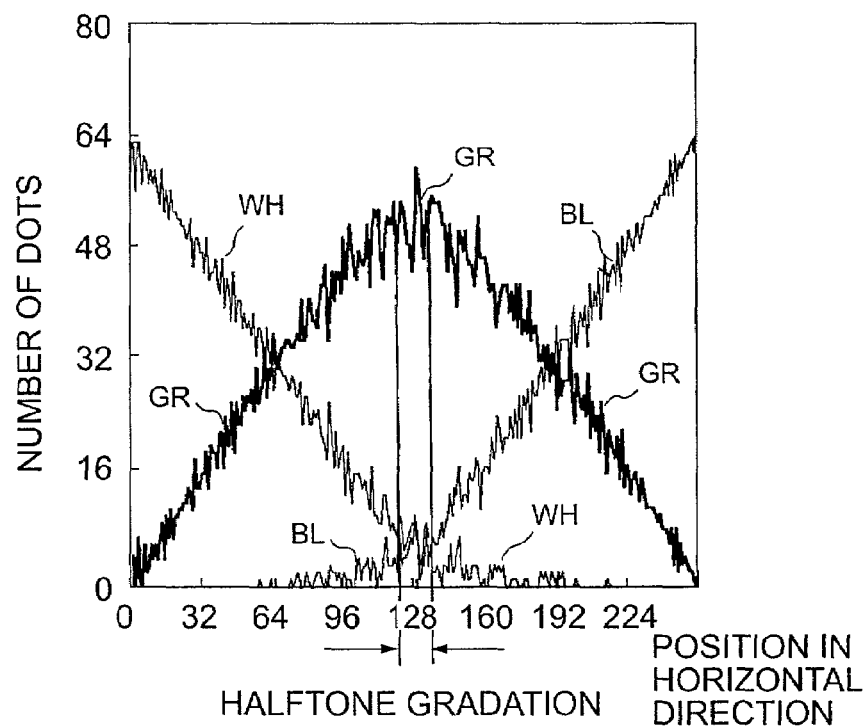
FIG. 42 is a graph showing a dot distribution.
Figure 43:
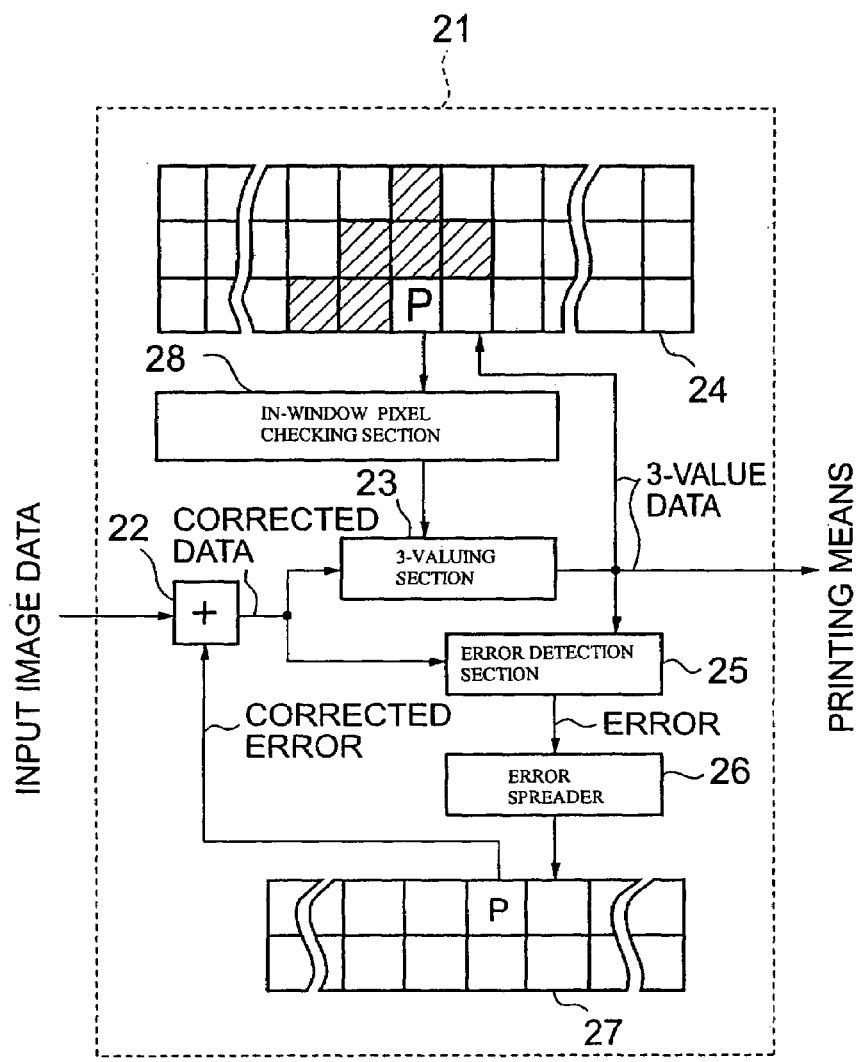
FIG. 43 is a block diagram showing the configuration of a conventional art.

FIG. 36 is a diagram showing an example of an amplitude limit value in accordance with the present invention. The abscissa represents the value of input image data and the ordinate represents the amplitude limit value. The maximum amplitude of pseudo-random numbers is slightly increased with respect to the median of the dynamic range of the input value or a value close to the median. More specifically, in this example, the amplitude limit value is set to 9 only when the input image data value is 127 and when it is 128. FIG. 42 is a dot distribution diagram showing dot generation proportions in this example. The amplitude limit value is slightly increased with respect to the median of the dynamic range of the input value or a value close to the median to slightly increase the pseudo-random number value. The input data value is thereby caused to vary more largely, so that the instability of occurrence of gray dots [1] is slightly increased and the proportion is reduced. As a result, a dot distribution such as shown in FIG. 42 is obtained. In a dot distribution such as shown in FIG. 42, the proportion of gray dots [1] is high, the distributions of white dots [0] and black dots [2] do not break, and the continuity of gradation reproduction is maintained, thus achieving visually favorable gradation reproduction.

Figure 37:
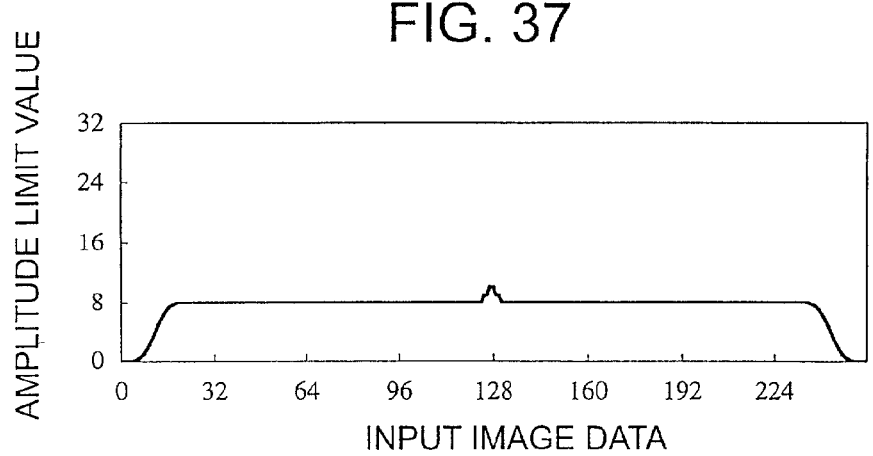
FIG. 37 is a block diagram showing another example of an amplitude table.
Figure 38:
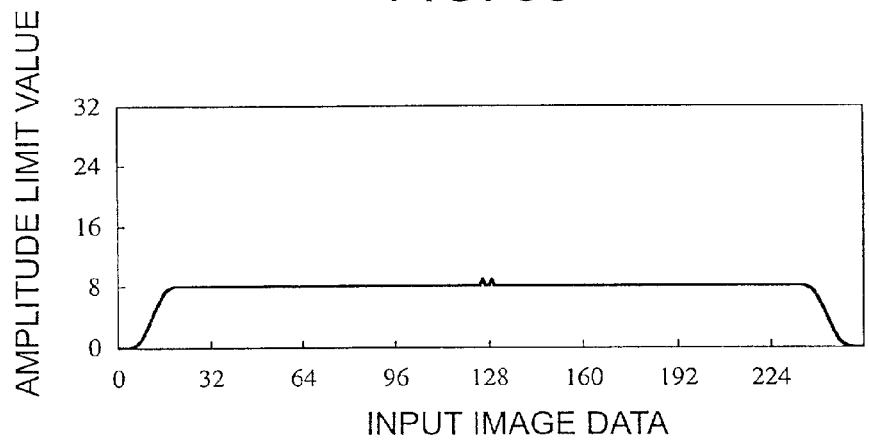
FIG. 38 is a block diagram showing another example of an amplitude table.

FIGS. 37 and 38 are diagrams showing other examples of the amplitude limit value in accordance with the present invention. FIG. 37 shows a case where the extent to which the maximum amplitude of pseudo-random numbers is slightly increased in comparison with the case shown in FIG. 36. When the input image data value is 127 or 129, the amplitude limit value is set to 9. When the input image data value is 128, the amplitude limit value is set to 10. FIG. 38 shows a case where a plurality of input image data values are set at which the maximum amplitude of pseudo-random numbers is slightly increased. When the input image data value is 127 and when it is 129, the amplitude limit value is set to 9.

The present invention is not limited to the above-described embodiment mode, and various modifications and changes may be made as long as the advantages of the invention are maintained.

As a means for determining the two sets of threshold values T1 and T2 , a computation section (not shown) may be separately provided to compute the magnitude and the interval of threshold values T1 and T2 according to input image data and weight coefficients. However, if threshold value LUT 11 is provided as described in the embodiment mode, there is no need to make computation, so that the processing can be simplified.

As an example of multivaluing, 3-valuing has been described in the embodiment mode and Embodiments 1 to 7. However, 4-valuing or any other multivaluing may be performed.

As a error diffusion method, a error diffusion method in a narrow sense, i.e., a method of spreading an error caused with respect to a target pixel to unprocessed neighbor pixels according to predetermined weight coefficients has been described in the embodiment mode. However, the present invention can also be applied to a two-level error diffusion method in which errors of a plurality of processed pixels are accumulated on the basis of predetermined weight coefficients to obtain a correction value. In short, the error diffusion method in the present invention comprises error diffusion methods in a broad sense including a two-level error diffusion method as well as a error diffusion method in a narrow sense.

The apparatus and method for gradation reproduction of continuous tone images have the advantages described below.

(1) According to the continuous tone image gradation reproduction method of the invention, the interval between the threshold values is determined so as to prevent generation of a transient region where the amplitude of the corrected data becomes excessively small at the halftone gradation of the corrected data. Therefore, the interval between the threshold values can be reliably selected so as to ensure continuity of gradation.

(2) According to the continuous tone image gradation reproduction method of the invention, suitable threshold values are determined according to the configuration of the weight coefficients. Thus, suitable threshold values can easily be realized.

(3) According to the continuous tone image gradation reproduction method of the invention, suitable threshold values are determined by referring to a threshold value LUT. In this manner, multivaluing processing can be simplified in comparison with on-demand computation of the magnitude and the interval of the threshold values according to input data and the weight coefficients.

(4) Since the interval between the threshold values is determined so as to prevent generation of a transient region where the amplitude of the corrected data becomes excessively small at the halftone gradation of the corrected data, the interval between the threshold values suitable for achieving continuous gradation can be easily realized. Also, the technique of adding pseudo-random numbers realizes favorable gradation reproduction even with respect to constantvalue halftone gradation data.

(5) The amplitude of pseudo-random numbers is controlled according to input image data to achieve a reproduction of halftone data in which white dots, gray dots and black dots are mixed, thus enabling expression of smooth gradation while preventing reproduction of unnecessary dots in reproduction of solid white or slid black. Further, occurrence of a discontinuity in reproduction of a continuous-gradation image can be prevented. Thus, improved gradation expression can be realized.

What is claimed is:

1. A method for gradation reproduction of a continuous tone image based on an error diffusion method in which, when the gradation of input image data on a continuous tone image is converted into multivalue data based on at least three values using at least two sets of threshold values to reproduce a gradation, an error between a data item before multivaluing and the corresponding multivalued data item is spread, as a corrected error and under spreading conditions determined by weight coefficients, to a plurality of subsequent data items successively input to obtain corrected data, and the corrected data is multivalued, the gradation reproduction method comprising the step of determining the interval between the threshold values so that an amplitude of the corrected data according to rising and falling variations in the corrected error spikes outward beyond the threshold values at least at a halftone gradation between a darkest gradation and a lightest gradation, whereby generation of a transient region where the amplitude of the corrected data becomes excessively small at the halftone gradation of the corrected data is prevented.

2. A method for gradation reproduction of a continuous tone image according to claim 1; wherein an amplitude of the corrected error is produced in accordance with the spreading conditions determined by the weight coefficients.

3. A method for gradation reproduction of a continuous tone image according to claim 2; further comprising the step of determining the threshold values in accordance with the gradation of the input image data by referring to a threshold value look-up table in which the threshold values and the interval between the threshold values are set in advance.

4. A method for gradation reproduction of a continuous tone image according to claim 1; further comprising the step of adding pseudo-random numbers to the input image data.

5. A method for gradation reproduction of a continuous tone image according to claim 4; wherein an amplitude of the pseudo-random numbers is set so as not to exceed a certain limit value.

6. A method for gradation reproduction of a continuous tone image according to claim 5; wherein the limit value of the amplitude of the pseudo-random numbers varies in accordance with the value of input image data.

7. A method for gradation reproduction of a continuous tone image according to claim 6; wherein the limit value of the amplitude of the pseudo-random numbers is zero when the value of input image data is zero or at a maximum of a dynamic range.

8. A method for gradation reproduction of a continuous tone image according to claim 6; wherein the limit value of the amplitude of the pseudo-random numbers is a value varying smoothly with respect to the input image data.

9. A method for gradation reproduction of a continuous tone image according to claim 6; further comprising the step of determining the limit value of the amplitude of the pseudo-random numbers by referring to an amplitude limit value look-up table in which limit values of the amplitude of the pseudo-random numbers according to the input image data are set in advance.

10. A method for gradation reproduction of a continuous tone image according to claim 6; wherein the limit value of the amplitude of the pseudo-random numbers is locally changed with respect to a median of a dynamic range or a value in the vicinity of the median.

11. A method for gradation reproduction of a continuous tone image according to claim 10; wherein the limit value of the amplitude of the pseudo-random numbers is changed in an increasing direction with respect to the median of the dynamic range or a value in the vicinity of the median.

12. A method for gradation reproduction of a continuous tone image, comprising the steps of:
   providing input image data corresponding to a target pixel among a plurality of pixels;
   adding pseudo-random numbers to the input image data;
   correcting the input image data to which the pseudo-random numbers have been added to form corrected data;
   converting the corrected data into multivalue data by comparing the corrected data to at least two threshold values and determining an interval between the threshold values so that an amplitude of the corrected data spikes outward beyond the threshold values at a halftone gradation of the corrected data to thereby prevent generation of a transient region where the amplitude of the corrected data becomes excessively small at the halftone gradation of the corrected data;
   computing an error between the corrected data and the multivalue data; and
   spreading the computed error to pixels neighboring the target pixel in accordance with preselected weight coefficients.

13. A method for gradation reproduction of a continuous tone image, comprising the steps of:
   providing input image data corresponding to a target pixel among a plurality of pixels;
   adding pseudo-random numbers to the input image data;
   setting an amplitude of the pseudo-random numbers so as not to exceed a certain limit value that varies in accordance with the value of the input image data;
   correcting the input image data to which the pseudo-random numbers have been added to form corrected data;
   converting the corrected data into multivalue data by comparing the corrected data to at least two threshold values;
   computing an error between the corrected data and the multivalue data; and
   spreading the computed error to pixels neighboring the target pixel in accordance with preselected weight coefficients.

14. A method for gradation reproduction of a continuous tone image, comprising the steps of:
   providing input image data corresponding to a target pixel among a plurality of pixels;
   adding pseudo-random numbers to the input image data;
   setting an amplitude of the pseudo-random numbers so as not to exceed a certain limit value that varies smoothly with respect to the input image data;
   correcting the input image data to which the pseudo-random numbers have been added to form corrected data;
   converting the corrected data into multivalue data by comparing the corrected data to at least two threshold values;
   computing an error between the corrected data and the multivalue data; and
   spreading the computed error to pixels neighboring the target pixel in accordance with preselected weight coefficients.

15. A method for gradation reproduction of a continuous tone image, comprising the steps of:
   providing input image data corresponding to a target pixel among a plurality of pixels;
   adding pseudo-random numbers to the input image data;
   setting an amplitude of the pseudo-random numbers so as not to exceed a certain limit value that is determined by referring to an amplitude limit value look-up table in which limit values of the amplitude of the pseudo-random numbers according to the input image data are set in advance;
   correcting the input image data to which the pseudo-random numbers have been added to form corrected data;
   converting the corrected data into multivalue data by comparing the corrected data to at least two threshold values;
   computing an error between the corrected data and the multivalue data; and
   spreading the computed error to pixels neighboring the target pixel in accordance with preselected weight coefficients.

* * * * *